US011675919B2

(12) United States Patent
Ramesh et al.

(10) Patent No.: US 11,675,919 B2
(45) Date of Patent: Jun. 13, 2023

(54) SEPARATION OF MANAGED AND UNMANAGED DATA IN A COMPUTING DEVICE

(71) Applicant: Apple Inc., Cupertino, CA (US)

(72) Inventors: Ananthakrishna Ramesh, Cupertino, CA (US); Andrew S. Terry, San Jose, CA (US); Wade Benson, San Jose, CA (US); Jeremy C. Andrus, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 16/683,238

(22) Filed: Nov. 13, 2019

(65) Prior Publication Data

US 2020/0380149 A1 Dec. 3, 2020

Related U.S. Application Data

(60) Provisional application No. 62/855,782, filed on May 31, 2019.

(51) Int. Cl.
| | |
|---|---|
| *H04L 29/06* | (2006.01) |
| *G06F 21/62* | (2013.01) |
| *G06F 21/44* | (2013.01) |
| *H04L 9/08* | (2006.01) |

(52) U.S. Cl.
CPC .......... *G06F 21/6218* (2013.01); *G06F 21/44* (2013.01); *H04L 9/0866* (2013.01)

(58) Field of Classification Search
CPC ..... G06F 21/6218; G06F 21/62; H04L 9/0866
See application file for complete search history.

(56) References Cited

U.S. PATENT DOCUMENTS

| | | | |
|---|---|---|---|
| 8,407,773 B1 * | 3/2013 | Hayter | .......... H04L 67/51 726/7 |
| 8,775,757 B2 | 7/2014 | Polzin et al. | |
| 8,832,465 B2 | 9/2014 | Gulati et al. | |
| 8,850,572 B2 | 9/2014 | Paterson et al. | |
| 8,873,747 B2 | 10/2014 | Polzin et al. | |
| 9,043,632 B2 | 5/2015 | Machnicki et al. | |
| 9,047,471 B2 | 6/2015 | Polzin et al. | |
| 9,547,778 B1 | 1/2017 | Paaske et al. | |

(Continued)

OTHER PUBLICATIONS

Face ID Secuirty, Nov. 2017, Apple Inc., 6 pages.
IOS Security, iOS 11, Jan. 2018, Apple Inc., 82 pages.

*Primary Examiner* — Jason K Gee
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to securely storing data at a computing device that is managed by an external entity. In some embodiments, a computing device maintains a first file system volume having data that is accessible to a user of the computing device and that is not managed by an entity external to the computing device. The computing device receives, from the entity external, a first request to configure the computing device to store data that is accessible to the user and managed by the external entity. In response to the first request, the computing device creates a second distinct file system volume to store the data managed by the external entity. In response to a second request from the external entity, the computing device subsequently removes the second file system volume.

20 Claims, 12 Drawing Sheets

(56) References Cited

U.S. PATENT DOCUMENTS

| | | |
|---|---|---|
| 2011/0252234 A1 | 10/2011 | De Atley et al. |
| 2014/0006772 A1* | 1/2014 | Qureshi .................... G06F 8/53 |
| | | 713/150 |
| 2014/0366157 A1* | 12/2014 | Yancey .................. G06F 21/53 |
| | | 726/28 |
| 2015/0150085 A1* | 5/2015 | Joshi ..................... H04W 12/37 |
| | | 726/3 |
| 2015/0172292 A1* | 6/2015 | Kuang ................ H04L 63/0884 |
| | | 713/155 |
| 2015/0347743 A1 | 12/2015 | Magee et al. |
| 2017/0199883 A1 | 7/2017 | Terry et al. |
| 2017/0357817 A1 | 12/2017 | Tamura et al. |
| 2017/0357830 A1 | 12/2017 | Benson et al. |
| 2017/0373843 A1 | 12/2017 | Benson et al. |
| 2018/0260578 A1* | 9/2018 | Orloff ................. G06F 21/6209 |

\* cited by examiner

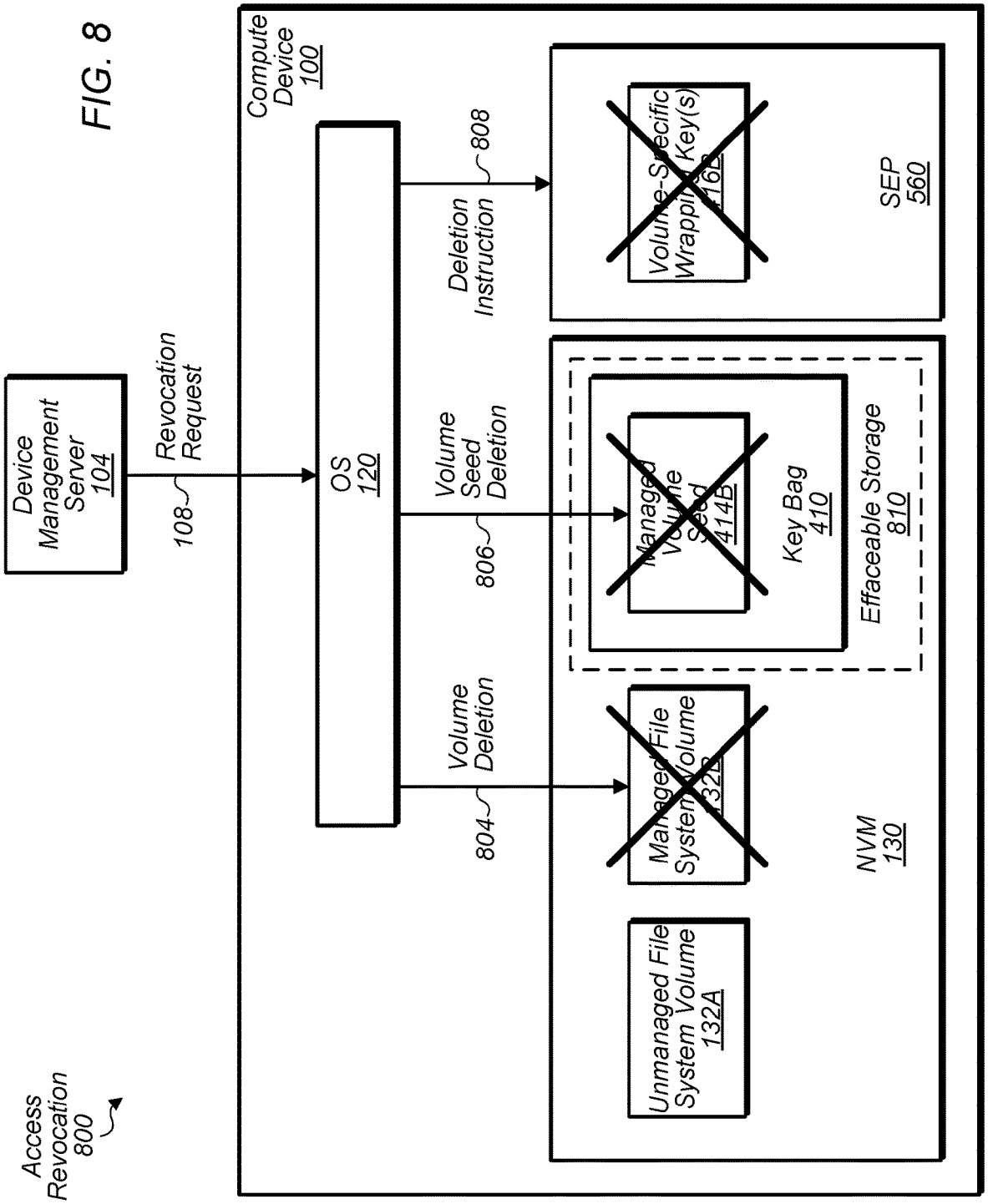

SEPARATION OF MANAGED AND UNMANAGED DATA IN A COMPUTING DEVICE

The present application claims priority to U.S. Prov. Appl. No. 62/855,782, filed May 31, 2019, which is incorporated by reference herein in its entirety.

BACKGROUND

Technical Field

This disclosure relates generally to computing devices, and, more specifically, to computing devices that support secure data storage.

Description of the Related Art

Computing devices can maintain large amounts of confidential information. For example, a user's mobile phone might store personal information such as contact information of friends and family, photographs, text messages, calendar information, personal emails, etc. Protecting this information can be important in order to prevent it from being acquired by some unauthorized actor. To restrict access to this information, a computing device may attempt to present a login screen that requires a user to provide a user name and password in order to obtain access to data stored therein. In some instances, a computing device may also use various means of encryption to protect information stored in the computing device.

BRIEF DESCRIPTION OF THE DRAWINGS

FIG. 8 is a block diagram illustrating an example of access revocation to a managed file system volume.

Figure 1:
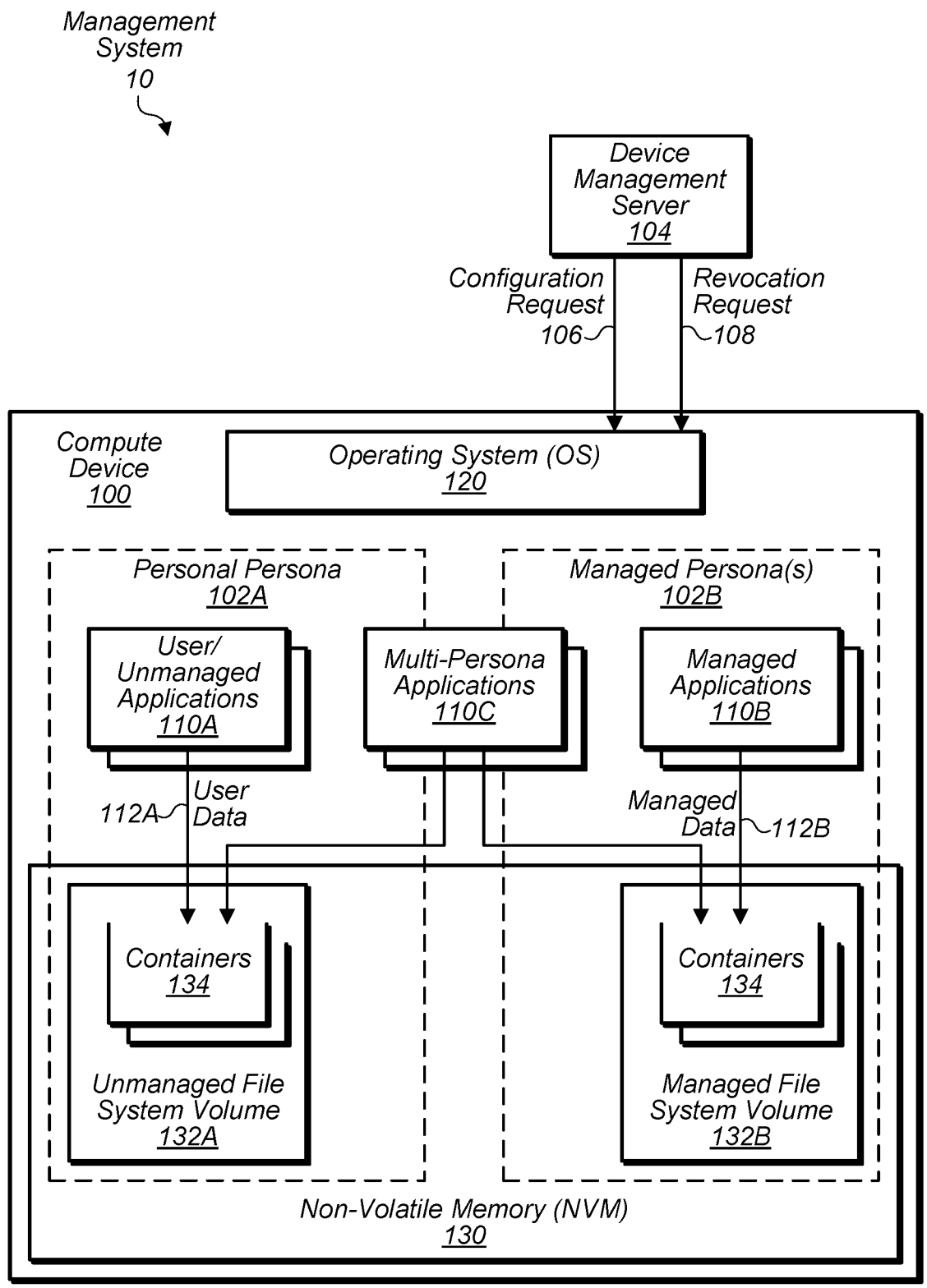
FIG. 1 is a block diagram illustrating an example of a system for externally managing data on a computing device using multiple file system volumes for unmanaged and managed data.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory controller circuit configured to read an encrypted file" is intended to cover, for example, an integrated circuit having circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a computing device may have a first file system volume and a second file system volume. The term "first" is not limited to the initial file system volume on the device. The term "first" may also be used when only one file system volume on the computing device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, an organization may consider adopting a bring-your-own-device policy that allows participants to use their own devices. For example, an employee at a company might want to use his or her personal computer to do work related tasks in order to have the ability to work from home, use equipment more suitable for his or her personal tastes, etc. Under such a scheme, the employee's computer may have work-related data that is used by the employee when acting in his or her role as an employee (e.g., data tied to his or her work persona) as well as personal data accessed when acting in a non-employee role (e.g., data tied to his or her personal persona). Because data tied to the employee's work persona can include confidential data (e.g., emails from a work account, work documents, credentials for accessing a work's internal network, etc.), an organization may be hesitant to adopt a bring-your-own-device policy as it may be difficult to manage data on an employee's personal device. For example, if an employee loses the device or later leaves a company, the company may want to ensure such information is appropriately removed, but may not have access to the device. In addition, if an organization does decide to allow the use of a personal device, it can be important for a user to be able to establish boundaries around his or her personal data.

The present disclosure describes embodiments in which a computing device is configured to ensure protection of a user's personal data while also protecting data managed by an external entity other than the user (e.g., an employer, a school, a copyright holder, a charity, etc.). As will be described in great detail below, a computing device may maintain a first file system volume storing a user's personal data and can separately store the external entity's data by creating a second separate file system volume that can be managed remotely by the entity. In various embodiments, each file system volume is encrypted using a separate cryptographic key to inhibit an application associated with one file system volume from accessing data located on another file system volume. In some embodiments, data access is further restricted through the use of containers assigned to applications as well as the use of inter-process communication vouchers discussed in greater detail below. If the external entity later decides to revoke access to its managed data, a request can subsequently be issued to the computing device to cause the computing device to remove the second file system volume, which can be quickly achieved by wiping one or more cryptographic keys associated with the second file system volume. Thus, a company, for example, can feel more confident knowing that it can still appropriately manage its data—even on a personal device. And, a user can establish boundaries the use of his or her personal data.

Turning now to FIG. 1, a block diagram of a management system 10 is depicted. In the illustrated embodiments, system 10 includes computing device 100, which includes user/unmanaged applications 110A, managed applications 110B, multi-persona-applications 110C, an operating system (OS) 120, and a non-volatile memory (NVM) 130. NVM 130 may include an unmanaged file system volume 132A and a managed file system volume 132B, which may include containers 114. As shown, user applications 110A and unmanaged file system volume 132A may belong to a personal persona 102A while managed applications 110B and managed file system volume 132B may belong to a managed persona 102B. System 10 may also include device management server 104 in communication with computing device 100. In some embodiments, system 10 may be implemented differently than shown. For example, system 10 may include multiple computing devices 100, computing device 100 may include multiple managed personas 102B, computing device 100 may include more (or less) components than shown such as the additional components discussed below with respect to FIG. 5-7, etc.

Personal persona 102A, in various embodiments, corresponds to the items accessed by a user in his or her personal role/persona. For example, user/unmanaged applications 110A may include game applications, photos applications, media consuming applications, messaging applications, other forms of user-installed applications, etc. Various forms of user data 112A accessed by applications 110A may include personal data such as emails, photos, text messages, contact information for friends and family, calendar information, documents, the contents of a user's home directory, desktop directory, user authentication credentials for logging into various websites and services, etc. In various embodiments, items that are part of personal persona 102A may be managed by a user of computing device 100; however, in FIG. 1, items are labeled as unmanaged (e.g., unmanaged file system volume 132A) vis-à-vis items in managed persona 102B (e.g., managed file system volume 132B) as items in personal persona 102A are not managed by the external entity managing file system volume 132B.

Managed persona 102B, in various embodiments, corresponds to the items accessed by a user in his or her role/persona with respect to an external entity (e.g., the user's employer, a school, a copyright holder, a charity, etc.) and are managed by the external entity. For example, managed applications 110B may include proprietary applications developed by the external entity, applications for accessing remote internal networks (e.g., virtual-private-network (VPN) applications, secure shell proxy applications, etc.), applications having a license held by the external entity, applications installed by the external entity, etc. Various forms of managed data 112B accessed by applications 110B may include confidential documents, authentication credentials tied to the external entity, contact information, etc.

Multi-persona applications 110C, in various embodiments, are applications that may be used by a user in both personal and managed personas 102. For example, applications 110C may include email applications, calendar applications, contact-storage applications, note-taking applications, word processing applications, web browsers, etc. Accordingly, such applications 110C may at times operate on user data 112A and at other times operate on managed data 112B. For example, in the case of an email application 110C, such an application may access user data 112A corresponding to user emails as well as managed data 112B corresponding to work emails.

Device management server 104, in various embodiments is configured to provide a way for an external entity to remotely manage a computing device 100 with respect to a managed persona 102B. Accordingly, server 104 may provide a user interface that allows an administration to specify various configuration information for managed persona 102B, which, in some embodiments, may be packaged into a profile to facilitate enrollment of a device 100. This configuration information may specify various device settings such as device restrictions, application restrictions, network configurations settings, etc. This configuration may also allow an external entity to identify managed applications 110B to be installed by computing device 100 or identify multi-persona applications 110C that are permitted to access managed data 112B. This configuration may also include managed data 112B to be provided to a computing device 100 such as media, books, documents, authentication credentials, etc. to be stored at device 100. In the illustrated embodiment, this configuration information may be conveyed in a configuration request 106 sent from server 104 to computing device 100 to cause device 100 to prepare to store data 112B managed by an entity external via server 104. In some instances, an external entity may later to determine to revoke a user's access to managed data 112B and have managed personal 102B removed after, for example, an employee has retired, moved to another job, etc. In the illustrated embodiment, device managed server 104 conveys a revocation request 108 to the computing device 100 to cause computing device 100 to remove managed persona 102B—but without affecting personal persona 102A. In some embodiments in which server 104 is communicating with multiple computing devices 100, server 104 may track devices 100 based on a unique device identifier (UDID) assigned by a manufacturer of computing devices 100. In another embodiment, server 104 may track devices using tokens substituted for the UDIDs to prevent exposure of the UDIDs to an operator of server 104.

OS 120, in various embodiments, is executable to manage various operations of computing device 100 including facilitating management of device 100 via device management server 104. Accordingly, OS 120 may receive a configuration request 106 and/or a revocation request 108 and take the appropriate actions to implement that request. In various embodiments discussed below, OS 120 facilitates management of managed data 112B by storing user data 112A and managed data 112 in separate respective files systems volumes 132A and 132B, respectively. As will be discussed with respect to FIG. 2, OS 120 may also install applications 110B in response to a configuration request 106 and create containers 134 to store managed data 112B for those applications 110B (as well as multi-persona applications 110C). As will be discussed with FIGS. 3A-3B, OS 120 may also route inter-process communications between applications 110, which may use a voucher to facilitate providing access to managed file system volume 132.

Unmanaged file system volume 132A, in various embodiments, is used to store user data 112A in NVM 130. In some embodiments, file system volume 132A may be the primary file system volume maintained by computing device 100 and may exist prior to any configuration request 106 being received. In such an embodiment, volume 132A may also include the binary executables (i.e., the executable program instructions) of OS 120 as well as applications 110A and 110C. File system volume 132 may be implemented in accordance with any suitable file system architecture such as the Extended Filesystem (EXT), Apple® File System (APFS), New Technology File System (NTFS), etc. Accordingly, file system volume 132A may group blocks of data 112A into files having names comprehendible by a user. File system volume 132B may also use a structure of directories for organizing files and facilitating file retrieval. In order to implement file system volume 132A, NVM 130 may store various forms of file system metadata. This metadata may include, for example, a volume header, which may include general information about a volume/partition such as the volume's name, universally unique identifier (UUID), size, creation date, location of particular file system data structures, etc. In some embodiments, the volume header 222 may correspond to the superblock used by UNIX-style file systems (e.g., EXT), the volume header in APFS, or $Volume in NTFS. This metadata may include file records, which may include various information about files such as a node ID, creation and modification dates, file permissions, a name of user creating the file, a file name, etc. In some embodiments, file records may include inodes in EXT, file thread records and file records in the catalog file of APFS, or file information in the master file table $MFT of NTFS. This metadata may include directory records 226, which may include various information about the directory structure of file system volume 132A such as the directory's name, identifiers for parent and child directories, the files included in the directory, creation and modification dates of the directory, permission information, etc. In some embodiments, directory records may include the HTree in EXT, directory records in the catalog file in APFS, or $MFT in NTFS. This metadata may also include an allocation structure, which may include information identifying which blocks of NVM 130 have been allocated for storing data (or which blocks are free to store data). In some embodiments, the allocation structure may correspond to the allocation file in APFS or $Bitmap in NTFS. As implied by the name, unmanaged file system volume 132B may be accessible to a user of computing device 100 and is not managed by an entity external via server 104 (but is managed by a user of computing device 100).

Managed file system volume 132B, in various embodiments, is used to store managed data 112B in NVM 130. In such an embodiment, OS 120 may create managed file system volume 132B in response to receiving a configuration request 106 to prepare device 100 to store managed data 112B and may subsequently remove managed file system volume 132B in response to receiving a revocation request 108. Being a distinct file system volume, managed file system volume 132B may include a separate volume header, separate file records, separate directory records, and separate allocation structures as discussed above with volume 132A.

In various embodiments, unmanaged file system volume 132A and managed file system volume 132B are cryptographically separated to restrict unauthorized access to the file system volumes 132. As will be described in greater detail below with respect to FIGS. 4-8, unmanaged file system volume 132A may be encrypted using a first cryptographic key derived based on a passcode of a user and a first seed associated with the unmanaged file system volume 132A while managed file system volume 132B is encrypted using a second cryptographic key derived based on the passcode and a second seed associated with the managed file system volume 132B. (As used herein, references to a key being "useable to decrypt/encrypt" include decrypting/encrypting with the key or using the key to derive (or decrypt) one or more additional keys that are used to decrypt/encrypt data.) In response to receiving a revocation request, OS 120 may remove the managed file system volume 132B along with the second seed to prevent a subsequent derivation of the second key; however, OS 120 does not remove the first seed so that access to unmanaged file system volume 132A remains after access to file system volume 132B has been revoked. In various embodiments, OS 120 further restricts access to file system volumes 132 such that a given unmanaged application 110A is not permitted to access managed data 112B and a given managed application 110B is not permitted to access user data 112A. In some embodiments, this restriction is achieved based on the user of containers 134.

Containers 134, in various embodiments, are operable to isolate/sandbox data of one application 110 from data of other applications 110 executing on computing device 100. Accordingly, a container 134 created for a given application 110 may include a region of NVM 130 dedicated to the application 110 such that the application 110 is the only application (excluding OS 120) capable of accessing the region. Thus, an application 110B having a container 134 in managed file system volume 132B may be prevented from accessing regions belonging to unmanaged file system volume 132A (as well as other regions of file system volume 132B external to the container 134). Similarly, an application 110A having a container 134 in unmanaged file system volume 132B may be prevented from accessing regions belonging to managed file system volume 132B (as well as other regions of file system volume 132A external to the container 134). In some embodiments, container 134 may limit what can be perceived by an executing application 110. For example, an application 110 may be prevented by its container 134 from knowing about outside processes of other applications 110 (and external processes of other processes 110 from knowing about internal processes of that application 110). In some embodiments, a container 134 may also present a limited perspective of the underlying hardware resources (such as presenting a virtual network interface as opposed to exposing to the physical interface), etc. For example, a container 134 may restrict what memory address ranges are allocated to an application 110 for memory-mapped input/output (MMIO) operations with respect to one or more peripheral devices. In some embodiments, containers 134 may be implemented using containers such as a virtual machine, control group (Cgroup), namespace, Linux container (LXC), etc.

In some instances, an application 110B or 110C having access to managed file system volume 132B may be interacting with another application/process that does not have access to file system volume 132B but may need access in order to perform some task (or provide some service) for the application 110B or 110C. As will be discussed below with respect to FIGS. 3A and 3B, in some embodiments, OS 120 can create, for an application 110B or 110, a voucher having a particular field that identifies an access right associated with managed file system volume 132B and the external entity. The application 110B or 110C may then convey the voucher via an inter-process communication to another application/process. This application/process may, in turn, present the voucher to OS 120 for verification—or convey the voucher via another inter-process communication to yet another application/process that may present the voucher to OS 120. If OS 120 can successfully confirm the presence of a particular field in the voucher, OS 120 may then grant temporary access to the other application/process to content stored in managed file system volume 132B. Use of vouchers in this manner may be helpful, for example, when an application 110B or 110C is interacting with a daemon providing some service such as synchronizing managed data 112B with a cloud service as will be discussed below.

Figure 2:
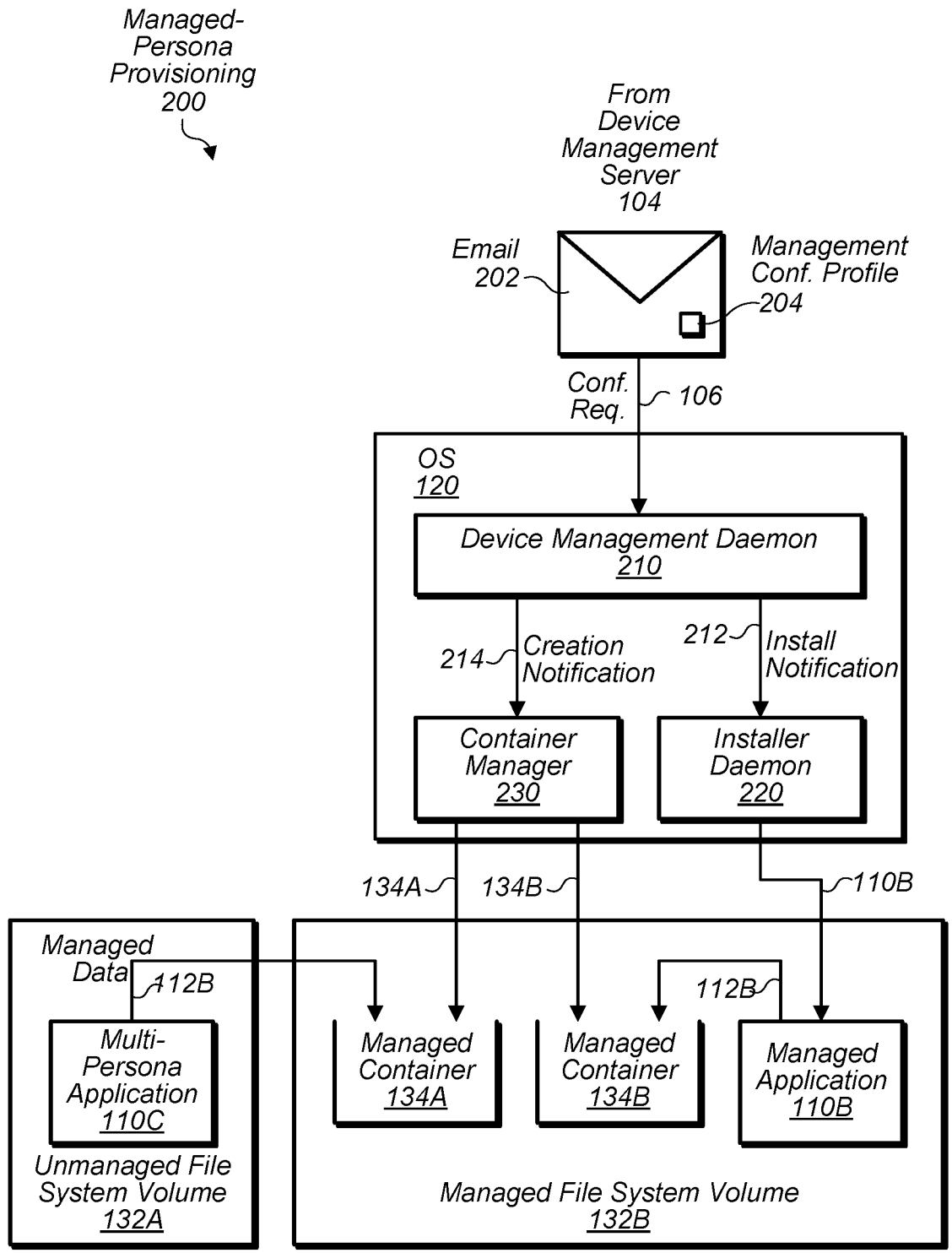
FIG. 2 is a block diagram illustrating an example of provisioning a managed file system volume with data managed by an external entity.

Turning now to FIG. 2, a block diagram of a profile provisioning 200 is depicted. As noted above, OS 120 may facilitate implementing a configuration request 106 to provision device 100 for a managed persona 102B. In the illustrated embodiment, OS 120 implements this provisioning using a device management daemon 210, installer daemon 220, and container manager 230 included in OS 120. In some embodiments, provisioning 200 may be implemented differently than shown. For example, OS 120 may implement functionality using a different set of daemons 210-230. In some instances, installer daemon 220 may not be used for provisioning 200.

Device management daemon 210, in various embodiments, is a daemon process executable to interface with device management server 104. Daemon 210 may communicate with server 104 in any suitable manner. For example, in some embodiments, daemon 210 may receive push notifications from server 104 including configuration requests 106 and revocation requests 108. In another embodiment, computing device 100 may be physically coupled to server 104 during an initial enrollment in which daemon 210 communicates over the physical connection. In the illustrated embodiment, configuration request 106 is sent as an attachment (shown as a management configuration profile 204) in an email 202 sent to computing device 100. In various embodiments, profile 204 is a data structure packaging various configuration information usable by daemon 210 to implement a given request 106. Accordingly, profile 204 may identify various settings to change, managed applications 110B to install, multi-persona applications 110C to grant access to managed data 112B, etc. In some embodiments, configuration profile 204 may further be signed with a digital signature in order to authenticate profile 204 and/or ensure integrity of profile 204. In response to receiving a configuration profile 204 (or more generally a configuration request 106), daemon 210 may validate the profile 204 and contact one or more additional daemons to facilitate implementing the requested configuration such as daemons 220 and 230.

Installer daemon 220, in various embodiments, is a daemon process executable to install applications 110. Accordingly, in response to install notification 212 indicating that installation of one or more particular applications 110B has been requested, daemon 220 may retrieve the appropriate bundle/packages including the binary executables of the particular applications 110B and install the applications 110B. In the illustrated embodiment, a managed application 110B is installed within managed file system volume 132B; however, in other embodiments, the application 110B may be installed elsewhere such as file system volume 132A or some other volume 132. In some embodiments, daemon 220 may be executable to interface with a remote server that maintains a repository of installation bundles/packages and retrieve the appropriate requested bundles from the server.

Container manager 230, in various embodiments, is a daemon process executable to create and enforce containers 134. (In some embodiments, container manager 230 may also handle creation of a new managed file system volume 132B if one does not already exist—although this may be handled by another process of OS 120 in other embodiments.) In the illustrated embodiment, container manager 230 creates a first container 134A for an already installed multi-persona application 110C, which may be identified in a configuration request 106 and a creation notification 214 as being permitted to access managed data 112B. Although shown as residing in unmanaged file system volume 132A, the binary executable of the multi-personal application 110C may reside elsewhere such as managed file system volume 132B. In the illustrated embodiment, container manager 230 also creates another container 134B for a managed application 110B installed by installer 220 and identified in a creation notification 214 from daemon 210. Container manager 230 may then enforce containers 134 to ensure that an application 110 does not access areas of NVM 130 outside of its container 134. Accordingly, managed application 110B may be permitted to access data 112B in container 134B, but prevented from accessing data 112B in managed container 134A as well as user data 112A in unmanaged file system volume 132A. Multi-persona application 110C may be permitted to access data 112A within container 134A, but prevented from accessing any data in container 134B or elsewhere in managed file system volume 132B. Being multi-persona, application 110C may also have another container 134 in file system volume 132A for storing user data 112A—and thus may be permitted to access data within that container 134.

Figure 3A:
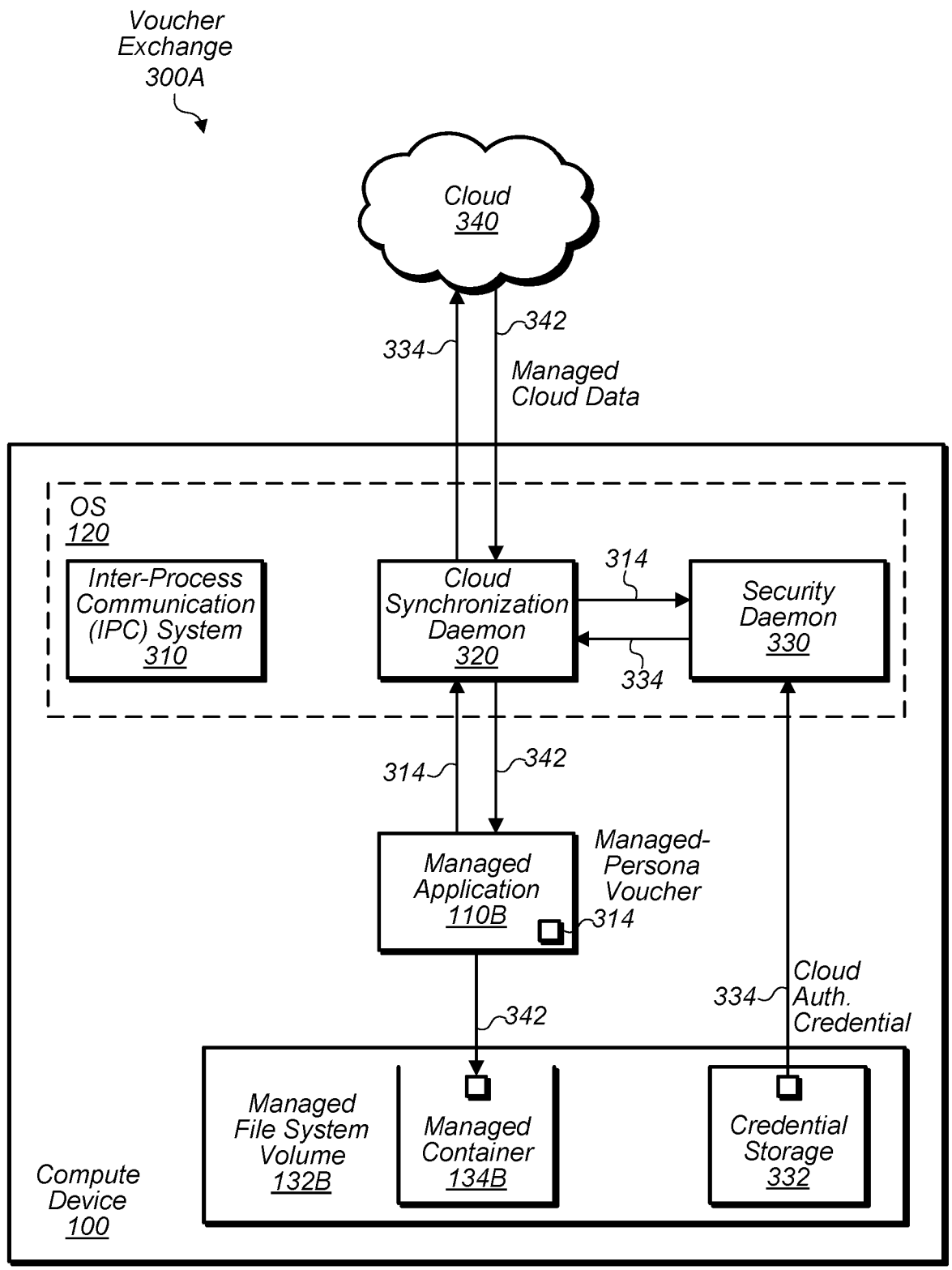
FIGS. 3A-3B are block diagrams illustrating examples of voucher exchanges to convey an access right to a managed file system volume.

Turning now to FIG. 3A, a block diagram of a voucher exchange 300A is depicted. As noted above, in some embodiments, OS 120 may provide a managed application 110B or 110C with a voucher that can be used to convey an access right for managed file system volume 132B to another application/process. In the illustrated embodiment, a managed application 110B may perform a voucher exchange 300A in which it interacts with an inter-process communication (IPC) system 310, cloud synchronization daemon 320, and a security daemon 330 of OS 120 to obtain data 342 from a cloud 340 using a voucher 314. In other embodiments, voucher exchange 300A may be implemented differently than shown such as discussed below with FIG. 3B; similarly voucher exchanges may also be used for purposes other than obtaining data from a cloud service.

IPC system 310, in various embodiments, is a set of program instructions executable to facilitate IPCs between processes/applications. In some embodiments, IPC system 310 is included in an operating system kernel of OS 120—thus, while various operations may be described herein as being performed by system 310, these operations may also be described more generally as being performed by an operating system kernel. In some embodiments, to facilitating routing an IPC, IPC system 310 may instantiate a destination port for a recipient application/process to receive an IPC and a reply port for a sending application/process to receive any subsequent reply.

Cloud synchronization daemon 320, in various embodiments, is a daemon process executable to synchronize data stored on a computing device 100 with a cloud service provided by cloud 340. In the illustrated embodiment, daemon 320 assists a managed application 110B with synchronizing a remote copy of managed cloud data 342 maintained by cloud 340 with a local copy of the data 342 in a managed container 134B accessible to managed application 110B.

Security daemon 330, in various embodiments, is a daemon process executable to maintain user authentication credentials, which may be used for various purposes such as authenticating to cloud 340. In the illustrated embodiment, security daemon 330 maintains a credential storage 332 having a cloud access credential 334, but is not permitted to access managed file system volume 132B without a voucher 314.

Cloud 340, in various embodiments, is an external computer cluster that provides cloud services to computing devices 100. In the illustrated embodiment, one such service is the storage of data 112B managed by the external entity.

In some embodiments, managed application 110B is provided with a managed-persona voucher 314 when it initially starts execution. In one embodiment, this voucher 314 may be provided by IPC system 310; however, in other embodiments, this voucher 314 may be provided by some other process of OS 120 such as launch daemon executable to start execution of application 110B, a voucher management daemon, the OS kernel, etc. As noted above, voucher 314 may include particular field identifying applications 110B's association to managed persona 102B—and thus its ability to convey an access right to managed file system volume 132B. In the illustrated embodiment, when managed application 110B wants to cause a synchronization with cloud 340, application 110B sends the voucher 314 in an IPC routed by system 310 to cloud synchronization daemon 320, which, in turn, sends another IPC including the voucher 314 to security daemon 330 in order to obtain cloud authentication credential 334. In some embodiment, being a component of OS 120, security daemon 330 may be capable of verifying voucher 314 in order to access credential storage 332 in managed file system volume 132B. In other embodiments, security daemon 330 may redeem the voucher 314 by conveying it to another process in OS 120 such as IPC system 310 (or some other process), which may perform the verification of voucher 314. In response to a successful verification of the voucher 314, security daemon 330 may be granted access to cloud authentication credential 334 in storage 332. Once obtained, security daemon 330 may provide the credential 334 via another IPC to cloud synchronization daemon 320, which may send the credential 334 to cloud 340 to authenticate. In response to a successful authentication, cloud 340 may permit daemon 320 to perform a synchronization in which daemon 320 may retrieve managed cloud data 342 from cloud 340 and provide data 342 via another IPC to managed application 110B for storage in its container 134B.

Figure 3B:
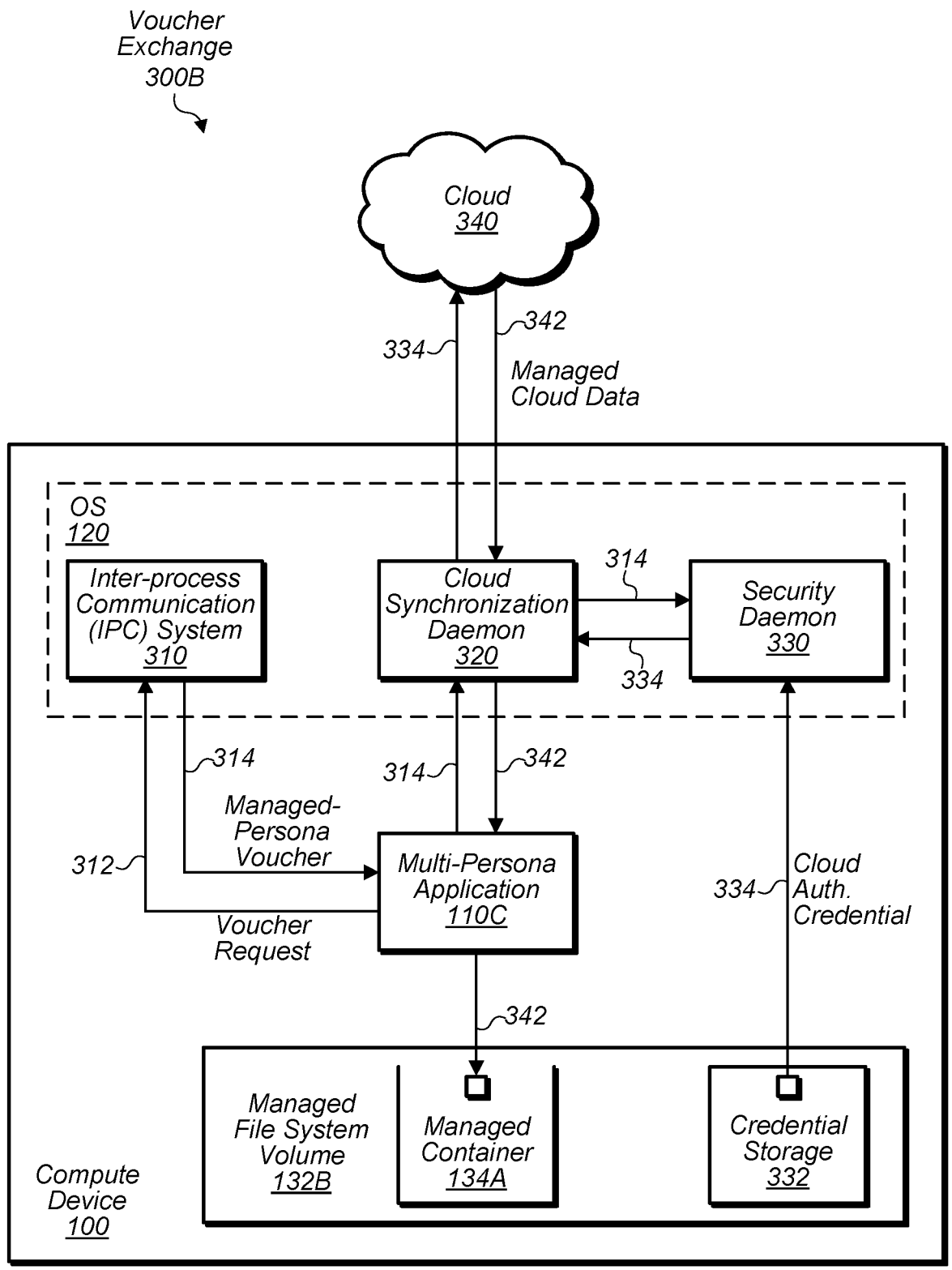

Turning now to FIG. 3B, a block diagram of a voucher exchange 300B is depicted. In the illustrated embodiment, voucher exchange 300B is a variation of exchange 300A, which may be performed for multi-persona application 110C. In some embodiments, a multi-persona application 110C is not provisioned with a voucher 314 when application 110C's execution initiates as application 110C may be perform operations related personal persona 102A—and thus may not initially warrant access to managed file system volume 132B. As such, exchange 300B may be begin with application 110C sending a voucher request 312 to IPC system 310 (or some other process of OS 120 in other embodiments). IPC system 310 may then confirm that multi-persona application 110C is associated with managed persona 102B and thus has access managed file system volume 132B. In response to this confirmation being successful, IPC system 310 may then send a managed-persona voucher 314 to enable to multi-persona application 110C to grant access to managed file system volume 132B to other processes/applications. Once voucher 314 is obtained, application 110C may proceed to communicate with daemons 320 and 330 in a similar manner as discussed above with voucher exchange 330A. In other embodiments, exchange 300B may be implemented differently than shown in FIG. 3B.

Figure 4A:
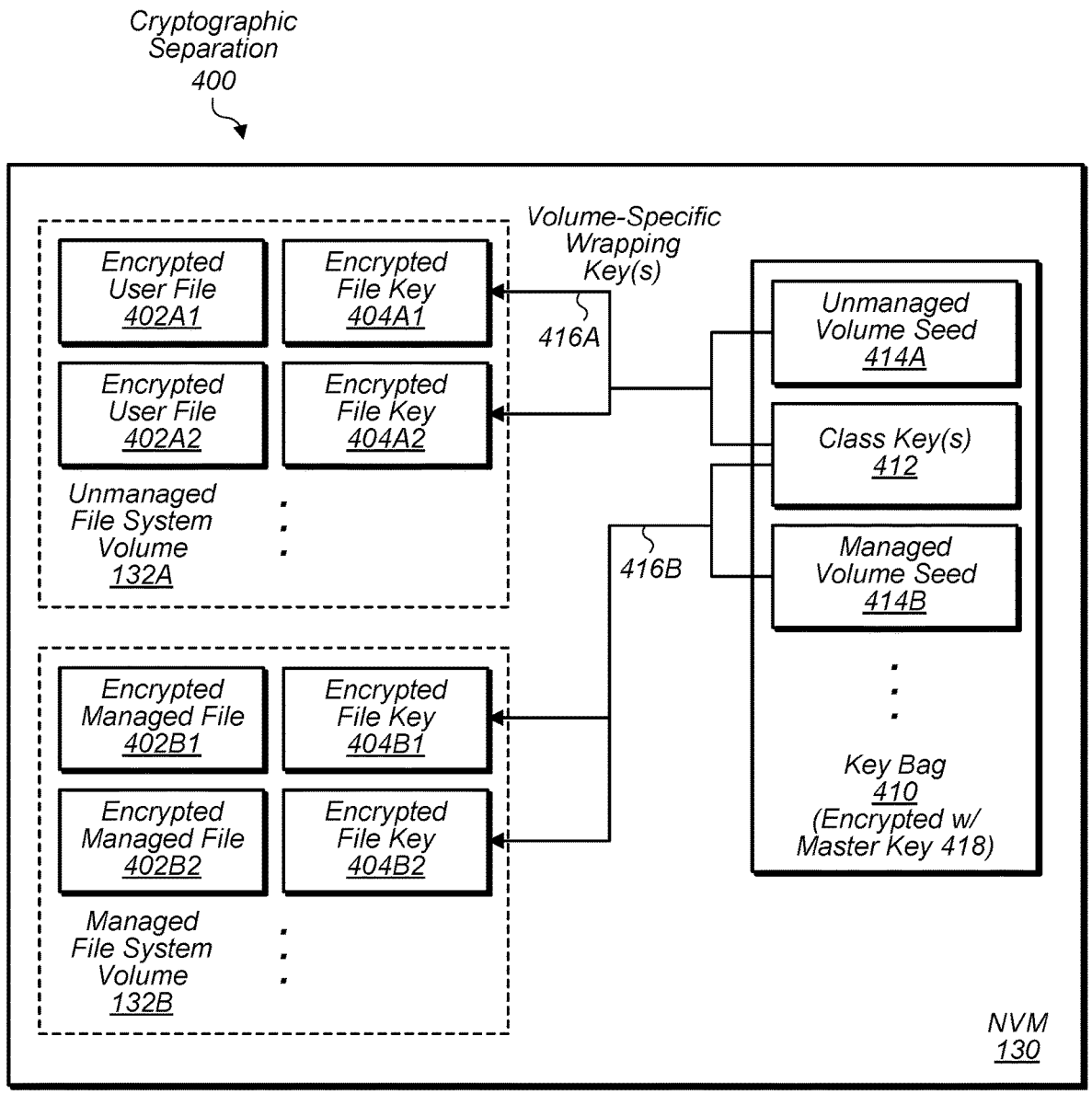
FIG. 4A-4C are block diagrams illustrating an example of cryptographically separating file system volumes with managed and unmanaged data.

Turning now to FIG. 4A, a block diagram of a cryptographic separation 400 of multiple file systems volumes 132. As noted above, in various embodiments, data stored in one file system volume 132 may be cryptographically separated from data stored in another file system volume 132. In the illustrated embodiment, cryptographic separation 400 implements such a separation using file keys 404 and a key bag 410 including class keys 412 and volume seeds 414. In some embodiments, cryptographic separation 400 may be implemented differently such as discussed below. NVM 130 may also include more contents than depicted.

As shown, user data 112A may be stored in multiple encrypted user files 402A within unmanaged file system volume 132A while managed data 112B may be stored in multiple encrypted managed files 402B. In the illustrated embodiment, each user file 402 is encrypted with a respective file key 404, which may be stored with that file 402. Accordingly, user file 402A1 may be encrypted with file key 404A1, managed file 402B1 may be encrypted with file key 404B1, and so forth in order to prevent those files from being accessible without decryption. In other embodiments, each key 404 may correspond to a data block having a different granularity than a file. For example, in some embodiments, a file 402 may comprise multiple file extents distributed across NVM 130, and each extent may be encrypted with a respective key 404 that is stored with that file extent. In still other embodiments, a single respective volume key may be used for each volume 132 (and may be derived in a similar manner as volume-specific wrapping keys 416).

In the illustrated embodiment, file keys 404 are, in turn, encrypted with one or more wrapping keys 416 that are specific to a respective file system volume 132. As will be described below with FIG. 4B, each volume-specific wrapping key 416 may be derived using a class key 412 and volume-specific seed 414 stored in a key bag 410. Accordingly, as shown, file keys 404A may be encrypted with a wrapping key 416A derived based on unmanaged volume seed 414A specific to unmanaged volume 132A while file keys 402B may be encrypted with a wrapping key 416B derived from managed volume seed 414B specific to managed volume 132B. In the illustrated embodiment, key bag 410 is further encrypted using master key 418 discussed below with respect to FIG. 4C. In some embodiments, key bag 410 may be one of multiple key bags 410, which may be each encrypted using master key 418—or each in encrypted with a respective master key 418. In some embodiments, wrapping keys 416 may be considered as part of key bag 410 once they are derived—or may be stored in encrypted key bag 410 in lieu of class keys 412 and seeds 414 in other embodiments.

In some embodiments, a given file 402 may be assigned a classification based on the contents of that file 402 and the particular needs for accessing those contents—e.g., all email files 402 may be assigned the same classification. In such an embodiment, files 402 assigned to the same classification may have their corresponding file keys 404 encrypted by a wrapping key 416 derived from the same class key 412 in a user's key bag 410. For example, in FIG. 2, files 402 A1 and 402A2 may be assigned to the same class, and thus, their file keys 404A and 404C may be encrypted by a wrapping key 416 derived from the same class key 412, which may be associated with a first class. In contrast, file 402B1 may be assigned to one class while file 402B2 may be assigned to another class. Thus, file key 404B1 may be encrypted by a wrapping key 416B derived from a first class key 412 while file key 404B2 may be encrypted by another wrapping key 416B derived by a different second class key 412. In some embodiments, a key bag 410 may include multiple class keys 412 belonging to the same class and/or class keys 412 belonging to different classes. In some embodiments, NVM 130 may also include multiple key bags 410.

Any suitable classification scheme may be used for files 402. In some embodiments, files 402 may be placed into one of four classifications. In such an embodiment, a first class may pertain to files 402 that remain unencrypt after a user restarts device 100 and logs into device 100 for the first time. For example, a file 402 including a user's Wi-Fi passwords may be assigned to this class. A second class may pertain to files 402 that are accessible only when the screen of device 100 is unlocked and accessible to the user. For example, a file 402 including a user's photo may be assigned to this class. A third class may pertain to files that can be written to when a screen of device 100 is locked, but not read from. For example, files 402 associated with a user's email may be assigned to this class as it may be beneficial to record email data as it is received at device 100. In some embodiments, data associated with this class may be encrypted using an asymmetric key pair. In such an embodiment, the encrypted data key 404 may be the private key of the pair while the corresponding public key may remain unencrypted after an initial login. A fourth class may pertain to files 402 that are not encrypted (or encrypted merely with a volume key that is not based on the user's passcode) such as system files in some embodiments.

Figure 4B:
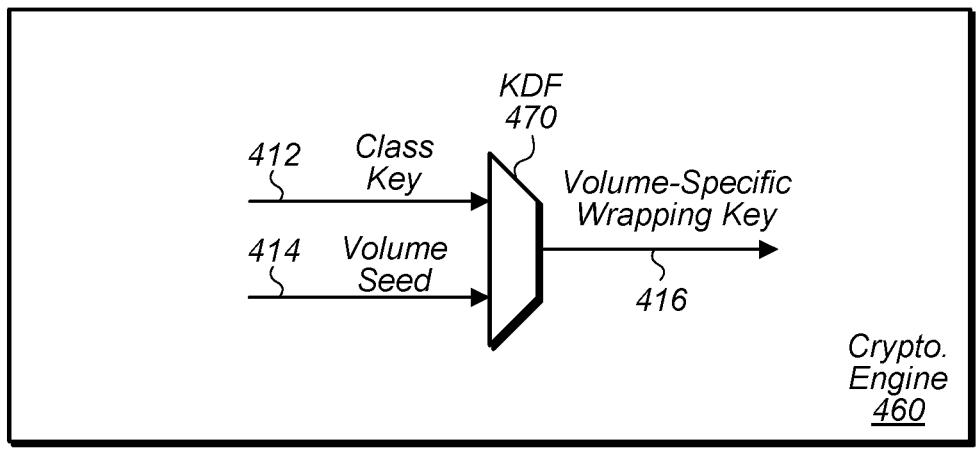

Turning now to FIG. 4B, a block diagram of a key derivation 450A of a volume-specific key 416. In the illustrated embodiment, cryptographic engine 460 is configured to perform a key derivation function (KDF) 470 taking a class key 412 and one of volume seeds 414A and 414B as inputs and to generate a volume-specific wrapping key 416. KDF 470 may correspond to any suitable key derivation function such as an application of AES in cipher block chaining (AES-CBC) mode, keyed-hash message authentication code (HMAC), Secure Hash Algorithm (SHA), etc. In other embodiments, engine 460 may derive a wrapping key 416 differently than shown—e.g., engine 460 may perform more key derivation functions, which may be based on more (or less) factors. As the class key 412 and the volume seed 414 may be encrypted by master key 418, a volume-specific wrapping key 416 may be described as being derived based on the one or more factors discussed below with respect to FIG. 4C and used to derive master key 418, which may be used to decrypt the class key 412 and volume seed 414 used to derive wrapping key 416. As will be discussed below with respect to FIGS. 5-7, in various embodiments, cryptographic engine 460 may be circuitry residing in a secure enclave processor, which may further use engine 460 to encrypt and decrypt file keys 404 with wrapping keys 416. Cryptographic engine 460 may also perform derivation of master key 418 and decryption of key bag 410. As will be described with respect to FIG. 8, key bag 410 may be placed in an effaceable storage within NVM 130 so that managed volume seed 414B within key bag 410 can be removed in response to a revocation request 108 in order to prevent derivation of wrapping keys 416B and thus prevent access to managed file system volume 132B.

Figure 4C:
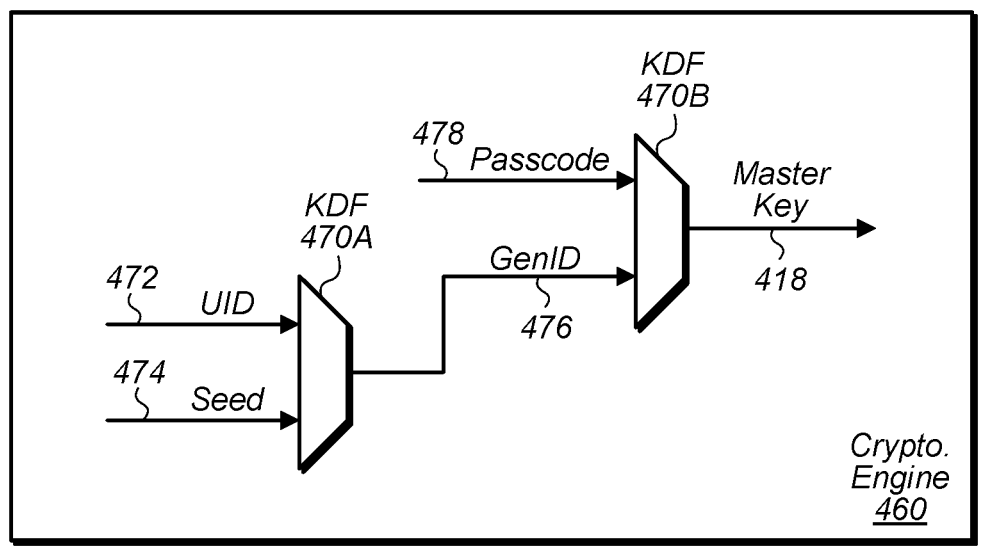

Turning now to FIG. 4C, a block diagram of a key derivation 450B of a master key 418. In the illustrated embodiment, engine 460 is configured to perform a first KDF 470A followed by a second KDF 470B to produce master key 418. In some embodiments, engine 460 may derive master key 418 differently than shown—e.g., engine 460 may perform more (or less) key derivation functions, which may be based on more (or less) factors.

KDF 470A, in the illustrated embodiment, produces a generated identifier (GenID) key 476 based on a unique identifier (UID) 472 and a seed 474. KDF 470A may correspond to any suitable key derivation function such as those noted above. In various embodiments, UID 472 is a value that uniquely identifies computing device 100 from other computing devices (or hardware within computing device 100 from similar hardware in other computing devices—thus, UID 472 may be a hardware seed). In some embodiments discussed below, UID 472 is stored in the secure enclave processor by burning a set of fuses to encode UID 472 during a fabrication of the secure enclave processor (or more generally device 100). Seed 474 may correspond to any suitable to seed data. For example, seed 474 may include an initialization vector (IV), other hardware identifiers, a key seed, etc. In some embodiments, seed 474 may include bits pertaining to software running on device 100 (e.g., a value associated with a particular version of OS 120) and/or bits pertaining to the hardware included in device 100.

KDF 470B, in the illustrated embodiment, produces a master key 418 based on GenID 476 and a passcode 478. KDF 470B may similarly correspond to any suitable key derivation function. In some embodiments, passcode 478 includes a sequence of user-supplied alpha-numeric characters, which may be received via an input device of computing device 100 such as a keyboard, touch screen, etc. In another embodiment, passcode 478 may correspond to some other form of user authentication data. In some embodiments, KDF 470B may take additional inputs such as a salt, padding, IV, etc.

Figure 5:
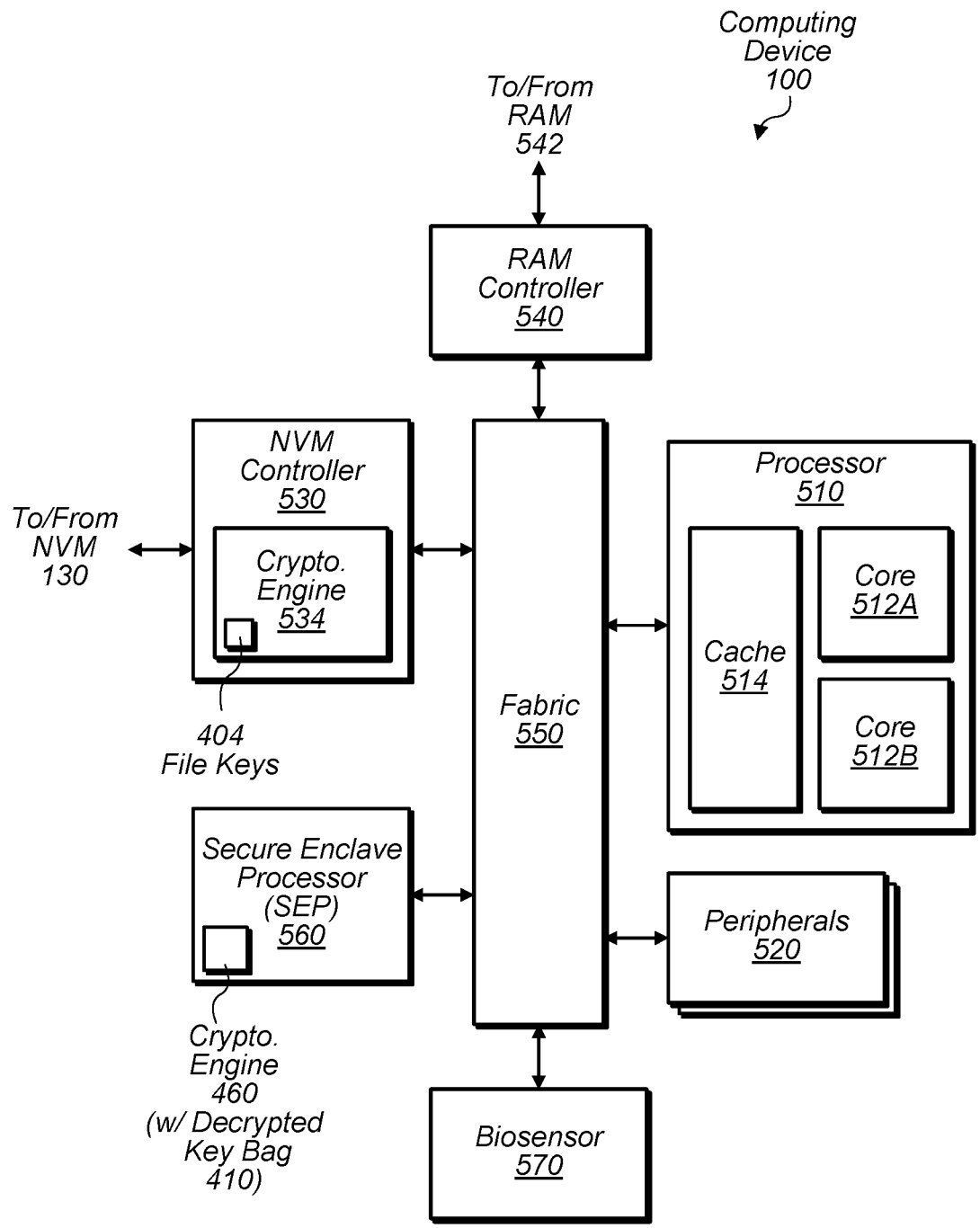
FIG. 5 is a block diagram illustrating an example of components within the computing device to facilitate using multiple file system volumes.

Turning now to FIG. 5, a block diagram of hardware components within computing device 100 is depicted. In general, computing device 100 may correspond to any suitable computing device/system. Accordingly, in some embodiments, device 100 may be a mobile device (e.g., a mobile phone, a tablet, personal data assistant (PDA), laptop, etc.), desktop computer system, server system, network device (e.g., router, gateway, etc.), microcontroller, wearable device (e.g., watch, head-mounted display, etc.), internet of things (IoT) device, etc. In the illustrated embodiment, computing device 100 includes a processor 510, one or more peripherals 520, a non-volatile memory (NVM) controller 530, random access memory (RAM) controller 540, fabric 550, secure enclave processor (SEP) 560, and biosensor 570. As shown, processor 510 may include multiple cores 512 and a cache 514. NVM controller 530 may include a cryptographic engine 534. Although not shown, in some embodiments, computing device 100 may include more (or less components) such as NVM 130 and RAM 542. In some embodiments, computing device 100 (or components within computing device 100) may be implemented as a system on a chip (SOC) configuration.

Processor 510, in various embodiment, is configured to execute various software that access data stored in NVM 130 and RAM 542 such as OS 120 and applications 110. In various embodiments, processor 510 is a central processing unit (CPU) for computing device 100. Accordingly, processor 510 may include circuitry configured to execute instructions defined in an instruction set architecture implemented by the processor. As noted above, processor 510 may include multiple processor cores 512A and 512B to support concurrent execution of program instructions. Cores 512 may also be multithreaded and operate on data stored in cache 514, which may correspond to an L2 cache.

Peripherals 520, in various embodiment, are other forms of hardware that are configured to operate on data stored in NVM 130 and RAM 542 and may perform input and/or output operations for computing device 100. For example, in one embodiment, peripherals 520 include a touch screen configured to display frames generated by computing device 100 as well as receive user touch inputs. Peripherals 520 may include a keyboard configured to receive key presses from a user and convey that information to processor 510. Peripherals 520 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 520 may include audio peripherals such as microphones, speakers, interfaces to microphones and speakers, audio processors, digital signal processors, mixers, etc. Peripherals 520 may include interface controllers for various interfaces external to computing device 100 including interfaces such as Universal Serial Bus (USB), peripheral component interconnect (PCI) including PCI Express (PCIe), serial and parallel ports, etc. Peripherals 520 may include networking peripherals such as media access controllers (MACs).

NVM controller 530, in various embodiment, is configured to facilitate accessing data stored in NVM 130, which may include various user data and system files. Controller 530 may generally include circuitry for receiving requests for memory operations from the other components of computing device 100 and for accessing NVM 130 to service those requests. Accordingly, controller 530 may include circuitry for issuing read and write commands to NVM 130, performing logical-to-physical mapping for data in NVM 130, etc. In some embodiments, controller 530 includes circuitry configured to handle various physical interfacing (PHY) functionality to drive signals to NVM 130. In some embodiments, NVM 130 may include various forms of solid-state memory such as NAND flash memory, NOR flash memory, nano RAM (NRAM), magneto-resistive RAM (MRAM), phase change RAM (PRAM), etc. In various embodiments, controller 530 is configured to send data read from NVM 130 over fabric 550 to various components of computing device 100 such as RAM controller 540. In such an embodiment, controller 530 may be configured to implement a direct memory access (DMA) controller that coordinates DMA transactions to exchange information associated with read and write operations over fabric 550 to components 510-570.

RAM controller 540, in various embodiment, is configured to facilitate reading and writing data to RAM 542, which may allow data to be more quickly accessed than NVM 130. Similar to NVM controller 530, RAM controller 540 may generally include circuitry for servicing data requests associated with RAM 542. Accordingly, controller 540 may include circuitry configured to perform virtual-to-physical address mapping, generate refresh instructions, perform row address strobes (RAS) or column address strobes (CAS), etc. Controller 540 may also include PHY circuitry for handling the physical interfacing with RAM 542 such as receiving and transmitting data, data-strobe, CAS, and RAS signals. In some embodiments, memory 542 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.).

Communication fabric 550 may be any communication interconnect for communicating among the components of computing device 100. Fabric 550 may be bus-based, including shared bus configurations, cross bar configurations, and hierarchical buses with bridges. Fabric 550 may also be packet-based, and may be hierarchical with bridges, cross bar, point-to-point, or other interconnects.

As noted above, in various embodiments, computing device 100 is configured to implement cryptographic isolation for data stored in different file system volumes 132 within NVM 130 in order to prevent unauthorized access to the stored data. In doing so, data on NVM 130 may also prevent malicious software running on processor 510 from accessing stored data as well as malicious attacks via peripherals 520. As will be discussed below, in various embodiments, computing device 100 implements cryptographic isolation via cryptographic engine 534, SEP 560, and/or biosensor 570.

Cryptographic engine 534, in various embodiment, is circuitry configured to encrypt data being written to NVM 130 by NVM controller 530 and decrypt data being read from NVM 130 by controller 530. Cryptographic engine 534 may implement any suitable encryption algorithm such as Data Encryption Standard (DES), Advanced Encryption Standard (AES), Rivest Shamir Adleman (RSA), Elliptic Curve Cryptography (ECC), etc. In the illustrated embodiment, engine 534 is configured to encrypt and decrypt data with file keys 404. In other embodiments, engine 534 may use keys for other data block granularities such as directories of files, file system volumes, etc.

SEP 560, in various embodiments, is a secure circuit configured to perform cryptographic services for computing device 100. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. In some embodiments, responses from SEP 560 are authenticated through the use of cryptography such as providing a digital signature or encrypted data. In some embodiments, responses from SEP 560 are authenticated by being communicated through a trusted communication channel such as a dedicated bus between SEP 560 and the other party or a mailbox mechanism discussed below with FIG. 7. For example, in various embodiments, SEP 560 and biosensor 570 communicate via secure channel established using shared cryptographic keys. In contrast, a circuit such as a hardware accelerator that merely operates on some received value and returns a result would not be considered a secure circuit within the meaning of this disclosure. By authenticating results that are returned, such as by signing with a verifiable digital signature, a secure circuit may thus provide anti-spoofing functionality. Additionally, in some cases, a secure circuit may be said to be "tamper-resistant," which is a term of art referring to mechanisms that prevent compromise of the portions of the secure circuit that perform the one or more services.

As noted above and will be described below with FIG. 6, in various embodiments, SEP 560 is configured to encrypt file keys 404 with wrapping keys 416 from contents in key bags 410 for storage on NVM 130, and decrypt file keys 404 when needed by engine 534 for encryption or decryption of data in NVM 130. In some embodiments, SEP 560 is also configured to communicate keys 404 with engine 534 over a secure connection established using a shared key known only to SEP 560 and engine 534. As also discussed above, in various embodiments, SEP 560 is configured to wrap a key bag 410 with master key 418 derived by SEP 560 and to store the wrapped key bag 410 in NVM 130 for long term storage. SEP 560 may later retrieve the wrapped key bag 410 and unwrap it by re-deriving master key 418 with a newly supplied credential from the user. In some embodiments, SEP 560 may require that a user supply a credential to unwrap a key bag 410 only after certain events such as after a restart of device 100. In other events, such as when a user locks a screen of device 100, SEP 560 may rely on biosensor 570 to extend the use of a previously unwrapped key bag 410 (as opposed to requesting that the credential again).

Biosensor 570, in one embodiment, is configured to detect biometric data for a user of computing device 100. Biometric data may be data that uniquely identifies the user among other humans (at least to a high degree of accuracy) based on the user's physical or behavioral characteristics. For example, in some embodiments, biosensor 570 is a finger print sensor that captures fingerprint data from the user. In another embodiment, biosensor 570 is a camera that captures facial information from a user's face. In still another embodiment, biosensor 570 is an iris- (or retina-) scanner configured to capture information from a user's eye. In some embodiments, biosensor 570 may maintain previously captured biometric data of an authorized user and compare it against newly received biometric data in order to authenticate a user. (In other embodiments, SEP 560 may handle storage and comparison of biometric data as discussed below with FIG. 6.) In various embodiments, after SEP 560 initially unwraps a key bag 410, SEP 560 is configured to rewrap the key bag 410 if an event occurs, such as the user locking a screen of device 100. SEP 560 may then provide a token that includes the key used to perform the rewrapping to the biosensor 570 (or in other embodiments the biosensor pipeline within SEP 560 discussed below). When the key bag 162 is later needed, SEP 560 may request the token from biosensor 570 (as opposed to asking for the user's credential again). In such an embodiment, biosensor 570 may then collect new biometric data from the user and compare it against previously stored biometric data for that user. If a match is determined, biosensor 570 may return the token enabling SEP 560 to unwrap the key bag 162.

Figure 6:
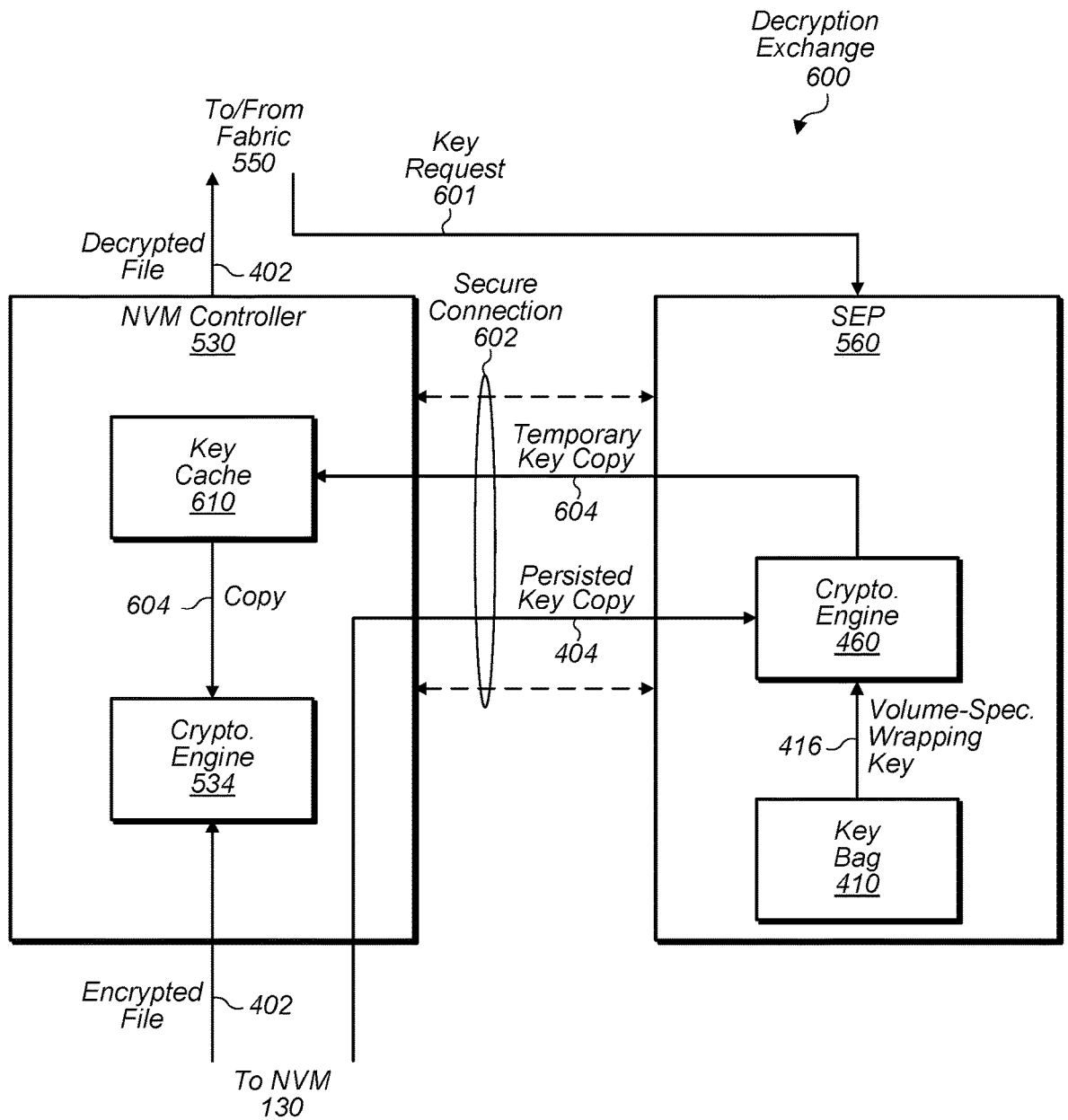
FIG. 6 is a block diagram illustrating an example of a decryption exchange to decrypt an encrypted file stored in a file system volume.

Turning now to FIG. 6, a block diagram of a decryption exchange 600 is depicted. As noted above, in some embodiments, encrypted files 402 being read from NVM 130 may be decrypted by a cryptographic engine 534 in NVM controller 530 and using keys 404 provided by SEP 560. In the illustrated embodiment, NVM controller 530 may include a key cache 610 in addition to crypto engine 534. As noted above, SEP 560 includes crypto engine 460 along with memory storing a key bag 410 decrypted with master key 418 and, in some embodiments, including derived wrapping keys 416.

As shown, SEP 560 may receive a key request 601, which may be received from OS 120 executing on processor 510 and indicate that a particular file 402 is going to be accessed. In response, NVM controller 530 may read the encrypted version of the corresponding key 404 (shown as the persisted key copy 404 as it is persisted in NVM 130) and provide the key 404 over secure connection 602. Crypto engine 460 within SEP 560 may decrypt the key 404 using a volume-specific wrapping key 416 determined based on the particular file system volume 132 where the file 402 is located. Once key 404 is decrypted, SEP 560 provides a temporary key copy 604 of the key 404 via secure connection 602 to NVM controller 530. As mentioned above, in some embodiments, secure connection 602 is implemented using a cryptographic key shared between SEP 560 and NVM controller 530. In other embodiments, secure connection 602 is a dedicated line between SEP 560 and NVM controller 530.

Key cache 610, in various embodiments, is a memory configured to store temporary key copies 604 of keys 404 received from SEP 560. Cryptographic engine 534 may then retrieve keys 604 from cache 610 as warranted in order to decrypt files 402 read from NVM 130 by NVM controller 530. Once decrypted, a file 402 may then be provided via fabric 550 to its destination such as RAM 542 or processor 510. Similarly, if file 402 is being written to NVM 130 by NVM controller 530, SEP 560 may provide a temporary key copy 604 to cache 610 to encrypt the file 402 for storage in NVM 130 as well as an encrypted persisted key copy 404 for storage with the file 402.

Figure 7:
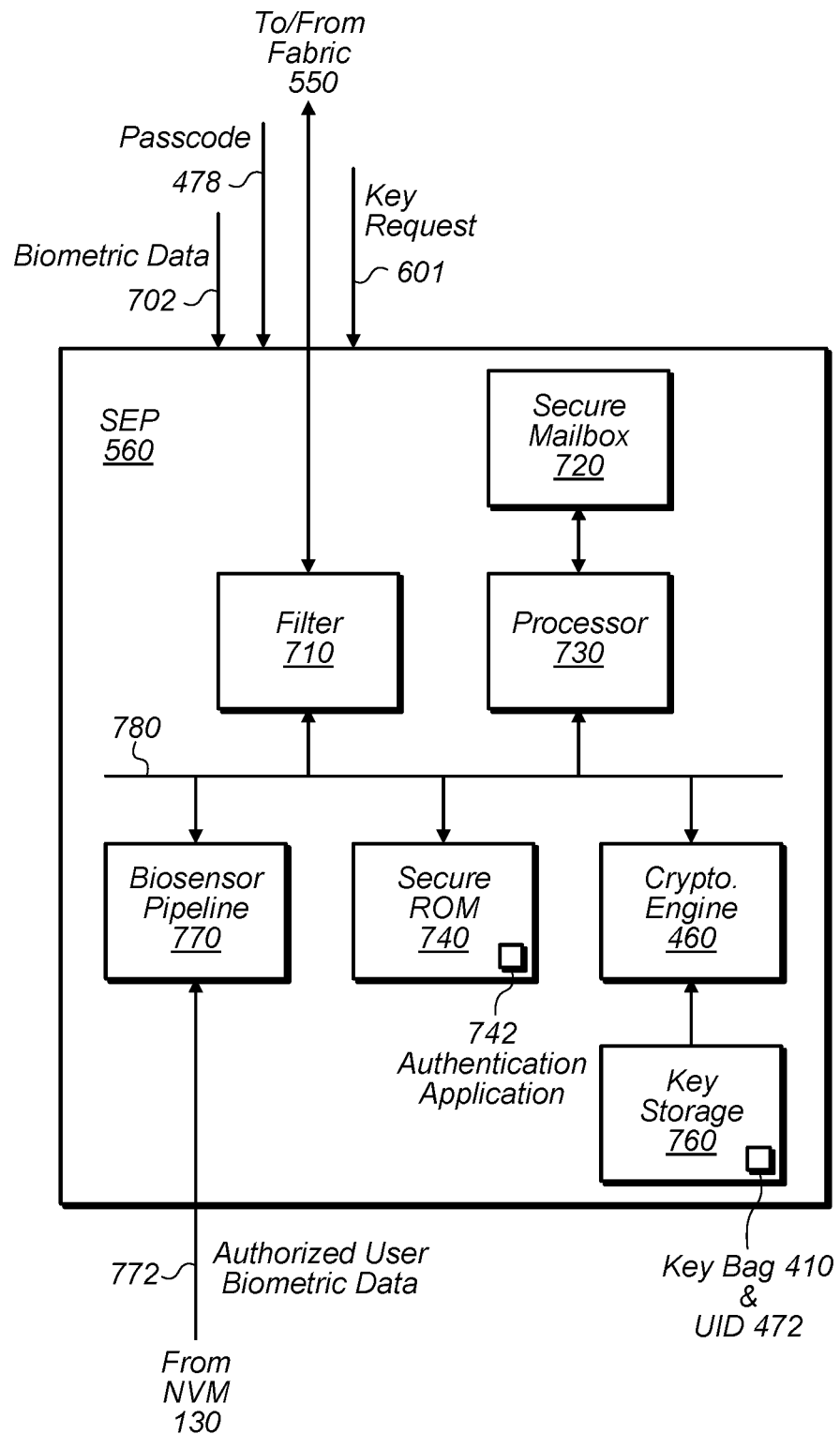
FIG. 7 is a block diagram illustrating an example of a secure circuit included in the computing device to facilitate the cryptographic separation of file system volumes.

Turning now to FIG. 7, a block diagram of SEP 560 is depicted. In the illustrated embodiment, SEP 560 includes a filter 710, secure mailbox mechanism 720, processor 730, secure ROM 740, cryptographic engine 460, a key storage 760, and a biosensor pipeline 770 coupled together via an interconnect 780. In some embodiments, SEP 560 may include more (or less) components than shown in FIG. 7. As noted above, SEP 560 is a secure circuit having tamper resistance. As discussed below, SEP 560 implements tamper resistance through the use of filter 710 and secure mailbox 720.

Filter 710, in various embodiments, is circuitry configured to tightly control access to SEP 560 to increase the isolation of the SEP 560 from the rest of computing device 100, and thus the overall security of the device 100. More particularly, in one embodiment, filter 710 may permit read/write operations from processor 510 (or other peripherals coupled to fabric 550) to enter SEP 560 only if the operations address the secure mailbox 720. Other operations may not progress from the fabric 550 into SEP 560. Even more particularly, filter 710 may permit write operations to the address assigned to the inbox portion of secure mailbox 720, and read operations to the address assigned to the outbox portion of the secure mailbox 720. All other read/write operations may be prevented/filtered by the filter 710. In some embodiments, filter 710 may respond to other read/write operations with an error. In one such embodiment, filter 710 may sink write data associated with a filtered write operation without passing the write data on to local interconnect 780. In one embodiment, filter 710 may supply nonce data as read data for a filtered read operation. Nonce data (e.g., "garbage data") may generally be data that is not associated with the addressed resource within the SEP 560. Filter 710 may supply any data as nonce data (e.g. all zeros, all ones, random data from a random number generator, data programmed into filter 710 to respond as read data, the address of the read transaction, etc.).

In various embodiments, filter 710 may only filter incoming read/write operations. Thus, the components of the SEP 560 may have full access to the other components of computing device 100 such as NVM 130. Accordingly, filter 710 may not filter responses from fabric 550 that are provided in response to read/write operations issued by SEP 560.

Secure mailbox 720, in various embodiments, is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from fabric 550. The outbox may store write data from write operations sourced by processor 730. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processor 510 may request services of SEP 560 via an application programming interface (API) supported by OS 120—i.e., a requester may make API calls that request services of SEP 560. These calls may cause corresponding requests to be written to mailbox mechanism 720, which are then retrieved from mailbox 720 and analyzed by processor 730 to determine whether it should service the requests. Accordingly, this API may be used to deliver, for example, a passcode 478, key requests 601, biometric data 702, etc. to mailbox 720. By isolating SEP 560 in this manner, integrity of SEP 560 may be enhanced.

SEP processor 730, in various embodiments, is configured to process commands received from various sources in computing device 100 and may use various secure peripherals to accomplish the commands. Processor 730 may then execute instructions stored in ROM 740 such as authentication application 742 to perform an authentication of a user in order to use cryptographic services of SEP such as performing operations using master key 418, key bag 410, wrapping keys 416, etc. discussed above. For example, SEP processor 730 may execute application 742 to provide appropriate commands to biosensor sensor pipeline 770 in order to verify biometric data 702 collected by biosensor 570. In some embodiments, program instructions executed by SEP processor 730 are signed by a trusted authority (e.g., device 100's manufacturer) in order to ensure their integrity.

Secure ROM 740, in various embodiments, is a memory configured to store program instruction for booting SEP 560. In some embodiments, ROM 740 may respond to only a specific address range assigned to secure ROM 740 on local interconnect 780. The address range may be hardwired, and processor 730 may be hardwired to fetch from the address range at boot in order to boot from secure ROM 740. Filter 710 may filter addresses within the address range assigned to secure ROM 740 (as mentioned above), preventing access to secure ROM 740 from components external to the SEP 560. In some embodiments, secure ROM 740 may include other software executed by SEP processor 730 during use. This software may include the program instructions to process inbox messages and generate outbox messages, etc.

Cryptographic engine 460, in various embodiments, is circuitry configured to perform cryptographic operations for SEP 560, including key generation as well as encryption and decryption using keys in key storage 760. Cryptographic engine 460 may implement any suitable encryption algorithm such as Data Encryption Standard (DES), Advanced Encryption Standard (AES), Rivest Shamir Adleman (RSA), etc. In some embodiments, engine 460 may further implement elliptic curve cryptography (ECC). As discussed above, in various embodiments, engine 460 is responsible for deriving wrapping keys 416 and master key 418 used to decrypt content in NVM 130.

Key storage 760, in various embodiments, is a local memory (i.e., internal memory) configured to store cryptograph keys such as master key 418, wrapping key 416, UID 472, seed 474, and/or GenID 476. In some embodiments, these keys may include keys used to establish the secure channels between SEP 560 and other elements such as NVM controller 530 and biosensor 570. Key storage 760 may include any type of memory such as the various examples of volatile or non-volatile memory listed above with respect to FIG. 5. In some embodiments, storage 760 may also include a set of fuses that are burnt during a fabrication of SEP 560 (or more generally device 100) in order to record keys such as UID 472 discussed above. In some embodiments, keys used by engine 460 may be temporarily stored in storage 760, but persisted in an encrypted form in NVM 130 due to the memory constraints of storage 760.

Biosensor sensor pipeline 770, in various embodiments, is circuitry configured to compare biometric data 702 captured by biosensor 570 from a user being authenticated with biometric data 772 of an authorized user. (In another embodiment, data 702 and 727 may be compared by software such as authentication application 742.) In some embodiments in which data 702 is collected from a user's face, pipeline 770 may perform the comparison using a collection of neural networks included in pipeline 770, each network being configured to compare biometric data 702 captured in a single frame with biometric data 772 captured in multiple frames for an authorized user. As shown, pipeline 770 may be configured to read, from NVM 130, biometric data 772, which may be protected by encryption in some embodiments and/or be stored in an associated part of NVM 130 that is only accessible to SEP 560. (In another embodiment, SEP 560 may store data 772 internally.) Based on the comparison of biometric data 702 and 772, SEP 560 may provide an authentication result indicating whether the authentication was successful or failed.

Turning now to FIG. 8, a block diagram of a revocation 800 of access to managed persona 102B is depicted. As noted above, in various embodiments, an external entity managing persona 102B may determine to revoke access to data maintained for managed persona 102B and instruct device management server 104 to issue a revocation request 108 to computing device 100 to remove managed data 112B. In the illustrated embodiment, OS 120 implements request 108 by performing a volume deletion 804 of managed file system volume 132B. In some embodiments, this may include updating a partition table in the master boot record of NVM 130 to remove any metadata about file system volume 132B and/or taking additional actions such as overwriting portions of file system volume 132B such as those including various file system metadata. To prevent a potential unauthorized recovery of file system volume 132B, OS 120 further performs volume seed deletion 806 of managed volume seed 414B within key bag 410, which in some embodiments, is stored in an effaceable storage 810 in NVM 130. As used herein, the term "effaceable storage" refers to a dedicated area of memory that can be addressed directly to wipe one or more contents securely. Accordingly, when OS 120 is overwriting managed volume seed 414B to delete it, OS 120 writes directly to a physical address in storage 810 where seed 414B is stored without initially performing a virtual-to-physical address translation to obtain the physical address of seed 414B. In the illustrated embodiment, OS 120 also sends a deletion instruction 808 to SEP 560 to cause it to remove any copies of wrapping keys 416B specific to volume 132B in order to prevent any further decryption of file keys 404B and thus prevent access to managed files 402B. Notably, however, OS 120 does not delete unmanaged file system volume 132A (as well as unmanaged volume seed 414A and volume-specific wrapping keys 416A) in response to a revocation request 108-thus, a user can continue to access his or her user data 112A associated with personal persona 102A after an external entity has decided to revoke access to managed data 112 associated with managed persona 102B. In other embodiments, revocation 800 may be implemented differently than shown in FIG. 8.

Figures 9A, 9B:
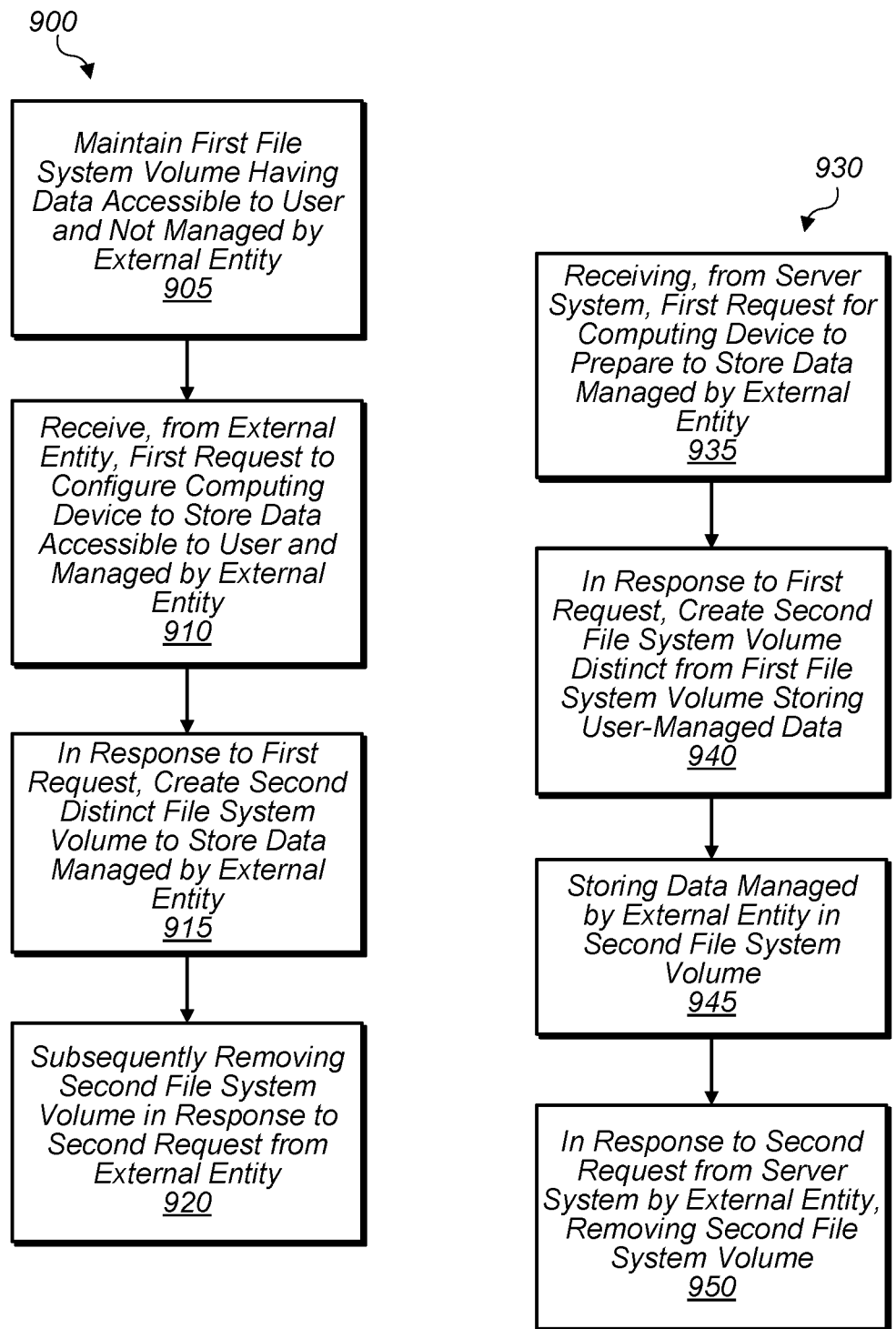
FIGS. 9A-9C are flow diagrams illustrating examples of methods for managing data stored at a computing device.

Turning now to FIG. 9A, a flow diagram of a method 900 is depicted. Method 900 is one embodiment of a method performed by a computing device having managed data such as computing device 100. In some instances, performance of method 900 may improve the security of computing device 100.

In step 905, a first file system volume (e.g., unmanaged file system volume 132A) is maintained having data (e.g., user data 112A) that is accessible to a user of the computing device and that is not managed by an entity external to the computing device.

In step 910, a first request (e.g., configuration request 106) is received from the external entity to configure the computing device to store data (e.g., managed data 112B) that is accessible to the user and managed by the external entity.

In step 915, a second distinct file system volume (e.g., managed file system volume 132B) is created, in response to the first request, to store the data managed by the external entity. In various embodiments, the first request identifies one or more applications (e.g. managed applications 110B) to be installed, and step 915 includes installing the one or more applications, including creating a respective container (e.g., a container 134) in the second file system volume for each of the one or more applications to store managed data of that application. In such an embodiment, a first of the one or more installed applications is prevented from accessing data external to the respective container of the first application (e.g., data in unmanaged file system volume 132A). In various embodiments, the first request identifies a particular application (e.g., a multi-persona application 110C) that is already installed on the computing device as being permitted to access data managed by the external entity, and step 915 includes creating a container (e.g., container 134A) in the second file system volume for the particular application to store data managed by the external entity. In such an embodiment, the particular application is preventing from accessing data in the second file system volume that is external to the container (e.g., data in container 134B).

In step 920, the second file system volume is subsequently removed in response to a second request (e.g., revocation request 108) from the external entity. In various embodiments, the second file system volume is encrypted using a cryptographic key (e.g., volume-specific wrapping key 416B) derived from a seed (e.g., managed volume seed 414B) associated with the second file system volume, the seed is stored in an effaceable storage (e.g., effaceable storage 810) of the computing device, and in response to the second request, the seed is removed (e.g., via volume seed deletion 806) from the effaceable storage to prevent a subsequent derivation of the cryptographic key. In some embodiments, a secure circuit (e.g., SEP 560) derives the cryptographic key based on the stored seed in the effaceable storage and receives, from a processor (e.g., processor 510), an indication (e.g., key request 601) that an encrypted file (e.g., encrypted file 402) of the second file system volume is to be accessed. In such an embodiment, the secure circuit uses the derived cryptographic key to decrypt an encrypted file key (e.g., file key 404) stored with the encrypted file and used to decrypt the encrypted file and, in response to the second request, removes (e.g., via deletion instruction 808) the derived cryptographic key from a memory (e.g., key storage 760) within the secure circuit. In some embodiments, a memory controller circuit (e.g., NVM controller 530) reads the encrypted file from a non-volatile memory (e.g., NVM 130) including the second file system volume, receives the decrypted file key (e.g., temporary key copy 604) from the secure circuit, and decrypts the encrypted file with the received decrypted file key.

In various embodiments, method 900 may further include an operating system (e.g., OS 120) of the computing device receiving a request (e.g., voucher request 312) to create a voucher (e.g., voucher 314) for a first application (e.g., multi-persona application 110C) having access to managed data in the second file system volume, the voucher being usable by the first application to convey a right to access the second file system volume to a second application (e.g., security daemon 330). In such an embodiment, the operating system creates the voucher for the first application and routes, from first application to the second application, an inter-process communication that specifies the created voucher to enable to the second application to access the second file system volume. In various embodiments, the operating system verifies the voucher in the inter-process communication to the second application, including confirming a presence of a particular field in the voucher before granting the second application access to the second file system volume, the particular field identifying an access right associated with the external entity. In some embodiments, the second application is granted, based on the presence of the particular field, access to an authentication credential (e.g., cloud access credential 334) stored in the second file system volume, the authentication credential being managed by the external entity. In some embodiments, the authentication credential is conveyed to a service (e.g., provided by cloud 340) external to the computing device and, based on a successful verification of the authentication credential, data (e.g., managed cloud data 342) managed by the external entity is received from the external service. In such an embodiment, the received data from the external service is provided to the first application is provided.

Turning now to FIG. 9B, a flow diagram of a method 930 is depicted. Method 930 is one embodiment of a method performed by software executing on a computing device having managed data such as OS 120. In some instances, performance of method 930 may improve the security of computing device 100.

In step 935, a first request (e.g., configuration request 106) from a server system (e.g., device management server 104) is received for the computing device to prepare to store data (e.g., managed data 112B) managed by an entity external to the computing device.

In step 940, in response to the first request, a second file system volume (e.g., managed file system volume 132B) is created distinct from a first file system volume (e.g., unmanaged file system volume 132A)) that stores data (e.g., user data 112A) managed by a user of the computing device. In some embodiments, the first file system volume is encrypted using a first cryptographic key (e.g., volume-specific wrapping key 416A) derived based on a passcode (e.g., passcode 478) of a user and a first seed (e.g., unmanaged volume seed 414A) associated with the first file system volume, and the second file system volume is encrypted using a second cryptographic key derived based on the passcode and a second seed (e.g., managed volume seed 414B) associated with the second file system volume.

In step 945, the data managed by the external entity is stored in the second file system volume. In various embodiments, a container (e.g., container 134) is created in the second file system volume for a first application (e.g., application 110B or 110C) identified in the first request, and data managed by the external entity is stored in the container for access by the first application. In some embodiments, the first application is restricted from accessing data on the second file system volume that resides outside of the container. In various embodiments, a voucher (e.g., voucher 314) is created for the first application that is usable by the first application to convey an access right to the second file system volume via an inter-process communication, the voucher is received from a second application (e.g., security daemon 330) that received the inter-process communication, and in response to a successful verification of the voucher, access is granted to the second application access to data in the second file system volume. In some embodiments, a credential (e.g., cloud access credential 334) is stored in the second file system volume, the credential being usable to authenticate to a cloud service (e.g., implemented by cloud 340) maintaining data (e.g., managed cloud data 334) managed by the external entity. In such an embodiment, the granting includes granting the second application access to the credential to enable retrieval of the maintained data from the cloud service for the first application.

In step 950, in response to a second request (e.g., revocation request 108) from the server system by the external entity, the second file system volume including the stored data managed by the external entity is removed. In some embodiments, the first and second seeds are stored in an effaceable storage (e.g., effaceable storage 810), and in response to the second request, the second seed is removed from the effaceable storage without removing the first seed to prevent a subsequent derivation of the second cryptographic key.

Figure 9C:
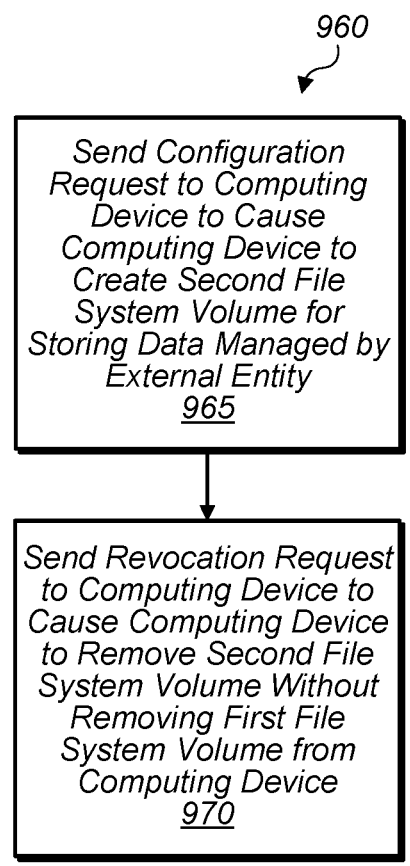

Turning now to FIG. 9C, a flow diagram of a method 960 is depicted. Method 960 is one embodiment of a method performed by a server system facilitating management of data on a computing device such as device management server 104. In some instances, performance of method 960 may improve the security of the computing device.

In step 965, a server system sends a configuration request (e.g., configuration request 106) to a computing device (e.g., computing device 100) to cause the computing device to create a second file system volume (e.g., a managed file system volume 132B) for storing data (e.g., managed data 112B) managed by an entity external to the computing device. In various embodiments, the second file system volume is distinct from a first file system volume (e.g., unmanaged file system volume 132A) of the computing device that stores data of a user (e.g., user data 112A) of the computing device and that is not managed by the external entity. In some embodiments, the computing device encrypts the second file system volume using a cryptographic key (e.g., wrapping key 416B) derived from a seed (e.g., managed volume seed 414B) stored in an effaceable storage (e.g., effaceable storage 810). In some embodiments, the computing device includes a secure circuit (e.g., SEP 560) configured to derive the cryptographic key based on the seed in the effaceable storage. In some embodiments, the configuration request identifies one or more applications (e.g., managed applications 110B or multi-persona applications 110C) to be permitted access to the data managed by the external entity, and the configuration request causes the computing device to create one or more corresponding containers (e.g., managed containers 134) in the second file system volume. In such an embodiment, each of the one or more corresponding containers is accessible by a respective one of the one or more applications to store a portion of the managed data operated on by the respective application. In some embodiments, sending the configuration request includes creating a configuration (e.g., management configuration profile 204) included as an attachment in an email (e.g., email 202) sent to the computing device.

In step 970, the server system sends a revocation request (e.g., revocation request 108) to the computing device to cause the computing device to remove the second file system volume (e.g., via volume deletion 804) without removing the first file system volume from the computing device. In some embodiments, the revocation request causes the computing device to remove the seed (e.g., via seed deletion 806) to prevent a subsequent derivation of the cryptographic key. In some embodiments, the revocation request causes the secure circuit to remove the derived cryptographic key (e.g., via deletion instruction 808) from a memory (e.g., key storage 760) within the secure circuit.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   a secure circuit that includes cryptographic circuitry;
   an effaceable storage configured to store cryptographic material;
   a processor;
   memory having program instructions stored therein that are executable by the processor to cause the computing device to perform operations comprising:
      maintaining a first file system volume having data that is accessible to a user of the computing device and that is not managed by an entity external to the computing device, wherein the first file system volume is encrypted by a first volume-wrapping key created by the cryptographic circuitry using first cryptographic material;
      receiving, from the external entity, a first request to configure the computing device to store data that is accessible to the user and managed by the external entity;
      in response to the first request, creating a second, distinct file system volume to store the data managed by the external entity, wherein the second, distinct file system volume is encrypted by a second volume-wrapping key created by the cryptographic circuitry using second cryptographic material stored in the effaceable storage;
      receiving, from the external entity, a second request to remove the data that is managed by the external entity from the computing device; and
      in response to the second request:
         performing a file system volume removal operation for the second file system volume;
         removing the second cryptographic material from the effaceable storage; and
         removing any copies of the second volume-wrapping key stored in the secure circuit.

2. The computing device of claim 1, further comprising:
   a memory controller circuit configured to:
      read an encrypted file from a non-volatile memory that includes the second, distinct file system volume;
      receive a decrypted file key from the secure circuit, wherein the decrypted file key was decrypted using the second volume-wrapping key; and
      decrypt the encrypted file with the received decrypted file key.

3. The computing device of claim 1, wherein the first request identifies one or more applications to be installed, and wherein the operations further comprise:
   installing the one or more applications, wherein the installing includes creating a respective container in the second, distinct file system volume for each of the one or more applications to store managed data of that application; and
   preventing a first of the one or more installed applications from accessing data external to the respective container of the first application.

4. The computing device of claim 1, wherein the first request identifies a particular application that is already installed on the computing device as being permitted to access data managed by the external entity, and wherein the operations further comprise:
   creating a container in the second, distinct file system volume for the particular application to store data managed by the external entity; and
   preventing the particular application from accessing data in the second, distinct file system volume that is external to the container.

5. The computing device of claim 1, wherein the operations further comprise:
   receiving, by an operating system of the computing device, a request to create a voucher for a first application having access to managed data in the second, distinct file system volume, wherein the voucher is usable by the first application to convey a right to access the second, distinct file system volume to a second application;
   creating, by the operating system, the voucher for the first application; and
   routing, by the operating system, an inter-process communication from the first application to the second application, wherein the inter-process communication specifies the created voucher to enable to the second application to access the second, distinct file system volume.

6. The computing device of claim 5, wherein the operations further comprise:
   verifying, by the operating system, the voucher in the inter-process communication to the second application, wherein the verifying includes confirming a presence of a particular field in the voucher before granting the second application access to the second, distinct file system volume, wherein the particular field identifies an access right associated with the external entity.

7. The computing device of claim 6, wherein the operations further comprise:
   based on the presence of the particular field, granting the second application access to an authentication credential stored in the second, distinct file system volume, wherein the authentication credential is managed by the external entity.

8. The computing device of claim 7, wherein the operations further comprise:
   conveying the authentication credential to a service external to the computing device;
   based on a successful verification of the authentication credential, receiving, from the external service, data managed by the external entity; and
   providing the received data from the external service to the first application.

9. The computing device of claim 1, wherein performing the file system volume removal operation for the second file system volume includes updating a partition table in the memory to remove metadata relating to the second file system volume.

10. The computing device of claim 9, wherein the performing the file system volume removal operation for the second file system volume further includes overwriting portions of the second file system volume that include file system metadata.

11. The computing device of claim 1, wherein the performing the file system volume removal operation for the second file system volume includes overwriting portions of the second file system volume that include file system metadata.

12. The computing device of claim 1, wherein the first cryptographic material is stored in the secure circuit.

13. A non-transitory computer readable medium having program instructions stored therein that are executable by a computing device to cause the computing device to perform operations comprising:
  receiving, from a server system, a first request for the computing device to prepare to store data managed by an entity external to the computing device;
  in response to the first request, creating a second file system volume distinct from a first file system volume that stores data managed by a user of the computing device, wherein the first file system volume is encrypted by a first volume-wrapping key created by cryptographic circuitry included in a secure circuit of the computing device using first cryptographic material;
  encrypting the second file system volume with a second volume-wrapping key created by the cryptographic circuitry using second cryptographic material stored in an effaceable storage of the computing device;
  storing the data managed by the external entity in the second file system volume; and
  in response to a second request from the server system by the external entity:
    performing a file system volume removal operation for the second file system volume:
      removing the second cryptographic material from the effaceable storage; and
      removing any copies of the second volume-wrapping key stored in the secure circuit.

14. The computer readable medium of claim 11, wherein the operations further comprise:
  creating a container in the second file system volume for a first application identified in the first request;
  storing data managed by the external entity in the container for access by the first application; and
  restricting the first application from accessing data on the second file system volume that resides outside of the container.

15. The computer readable medium of claim 14, wherein the operations further comprise:
  creating, for the first application, a voucher usable by the first application to convey an access right to the second file system volume via an inter-process communication;
  receiving the voucher from a second application that received the inter-process communication; and
  in response to a successful verification of the voucher, granting the second application access to data in the second file system volume.

16. The computer readable medium of claim 15, wherein the operations further comprise:
  storing a credential in the second file system volume, wherein the credential is usable to authenticate to a cloud service maintaining data managed by the external entity; and
  wherein the granting includes granting the second application access to the credential to enable retrieval of the maintained data from the cloud service for the first application.

17. A method, comprising:
  maintaining, by a computing device, a first file system volume having data that is accessible to a user of the computing device and that is not managed by an entity external to the computing device, wherein the first file system volume is encrypted by a first volume-wrapping key created by using:
    cryptographic circuitry in a secure circuit of the computing device; and
    first cryptographic material;
  receiving, by the computing device and from the external entity, a first request to configure the computing device to store data that is accessible to the user and managed by the external entity;
  in response to the first request, creating, by the computing device, a second file system volume to store the data managed by the external entity, wherein the second file system volume is encrypted by a second volume-wrapping key created by using:
    the cryptographic circuitry in the secure circuit; and
    second cryptographic material stored in an effaceable storage of the computing device;
  receiving, by the computing device from the external entity, a second request to remove the data that is managed by the external entity from the computing device; and
  in response to the second request:
    performing a file system volume removal operation for the second file system volume:
      removing the second cryptographic material from the effaceable storage to prevent a subsequent derivation of the second volume-wrapping key; and
      removing any copies of the second volume-wrapping key stored in the secure circuit.

18. The method of claim 17, further comprising:
  installing, by the computing device, one or more applications identified by the first request, wherein the installing includes creating a respective container in the second file system volume for each of the one or more applications to store managed data of that application; and
  preventing, by the computing device, a first of the one or more installed applications from accessing data external to the respective container of the first application.

19. The method of claim 17, wherein the first request identifies a particular application that is already installed on the computing device as being permitted to access data managed by the external entity, and wherein the method further comprises:
  creating a container in the second file system volume for the particular application to store data managed by the external entity; and
  preventing the particular application from accessing data in the second file system volume that is external to the container.

20. The method of claim 17, further comprising:
  receiving, by an operating system of the computing device, a request to create a voucher for a first application having access to managed data in the second file system volume, wherein the voucher is usable by the first application to convey a right to access the second file system volume to a second application;
  creating, by the operating system, the voucher for the first application; and
  routing, by the operating system, an inter-process communication from the first application to the second application, wherein the inter-process communication specifies the created voucher to enable to the second application to access the second file system volume.

* * * * *